United States Patent
Zhao

(10) Patent No.: US 9,106,964 B2
(45) Date of Patent: Aug. 11, 2015

(54) ENHANCED CONTENT DISTRIBUTION USING ADVERTISEMENTS

(71) Applicant: Verance Corporation, San Diego, CA (US)

(72) Inventor: Jian Zhao, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 13/763,247

(22) Filed: Feb. 8, 2013

(65) Prior Publication Data

US 2014/0075466 A1   Mar. 13, 2014

Related U.S. Application Data

(60) Provisional application No. 61/700,830, filed on Sep. 13, 2012.

(51) Int. Cl.
*H04H 20/14* (2008.01)
*H04H 60/29* (2008.01)
(Continued)

(52) U.S. Cl.
CPC ....... *H04N 21/4784* (2013.01); *G06Q 30/0249* (2013.01); *H04N 21/23892* (2013.01);
(Continued)

(58) Field of Classification Search
USPC ............................................. 725/22, 23, 25
See application file for complete search history.

(56) References Cited

U.S. PATENT DOCUMENTS 3,406,344 A   10/1968 Hopper
3,842,196 A   10/1974 Loughlin
(Continued)

FOREIGN PATENT DOCUMENTS

CA   2276638   1/2000
EP   0282734   2/1988
(Continued)

OTHER PUBLICATIONS

Verance Corporation, "Confirmedia," PowerPoint presentation made to National Association of Broadcasters, Apr. 24, 2001 (40 pages).
(Continued)

*Primary Examiner* — Pinkal R Chokshi
*Assistant Examiner* — Alexander Gee
(74) *Attorney, Agent, or Firm* — Perkins Coie LLP; Donald L. Wenskay

(57) ABSTRACT

Methods, devices, and computer program products are provided to enhance viewing of an entertainment content in the presence of advertisements. At a compliant device, an indication is received that the entertainment content is associated with a content policy information relating to presentation of advertisements during, or prior to, presentation of the entertainment content. A further indication is received that the entertainment content is associated with an advertisement award program. An advertisement award program message provides that the advertisements may be presented in a modified form in exchange for a specific number of award points. Upon receiving an indication agreeing to such an exchange, advertisements are allowed to be presented in a modified form. The content policy information can be ascertained through extraction of watermarks embedded in the advertisements or the entertainment content and/or through computation and matching of fingerprints associated with the advertisements or the entertainment content.

33 Claims, 11 Drawing Sheets

(51) Int. Cl.
  *H04N 7/16* (2011.01)
  *H04N 21/4784* (2011.01)
  *H04N 21/81* (2011.01)
  *H04N 21/2389* (2011.01)
  *H04N 21/44* (2011.01)
  *H04N 21/442* (2011.01)
  *H04N 21/454* (2011.01)
  *G06Q 30/02* (2012.01)

(52) U.S. Cl.
  CPC ... *H04N21/44016* (2013.01); *H04N 21/44204* (2013.01); *H04N 21/4542* (2013.01); *H04N 21/812* (2013.01)

(56) References Cited

U.S. PATENT DOCUMENTS

| | | | |
|---|---|---|---|
| 3,885,217 | A | 5/1975 | Cintron |
| 3,894,190 | A | 7/1975 | Gassmann |
| 3,919,479 | A | 11/1975 | Moon et al. |
| 3,973,206 | A | 8/1976 | Haselwood et al. |
| 4,048,562 | A | 9/1977 | Haselwood et al. |
| 4,176,379 | A | 11/1979 | Wessler et al. |
| 4,199,788 | A | 4/1980 | Tsujimura |
| 4,225,967 | A | 9/1980 | Miwa et al. |
| 4,230,990 | A | 10/1980 | Lert, Jr. et al. |
| 4,281,217 | A | 7/1981 | Dolby |
| 4,295,128 | A | 10/1981 | Hashemian et al. |
| 4,425,578 | A | 1/1984 | Haselwood et al. |
| 4,454,610 | A | 6/1984 | Sziklai |
| 4,464,656 | A | 8/1984 | Nakamura |
| 4,497,060 | A | 1/1985 | Yang |
| 4,512,013 | A | 4/1985 | Nash et al. |
| 4,547,804 | A | 10/1985 | Greenberg |
| 4,564,862 | A | 1/1986 | Cohen |
| 4,593,904 | A | 6/1986 | Graves |
| 4,639,779 | A | 1/1987 | Greenberg |
| 4,669,089 | A | 5/1987 | Gahagan et al. |
| 4,677,466 | A | 6/1987 | Lert, Jr. et al. |
| 4,686,707 | A | 8/1987 | Iwasaki et al. |
| 4,703,476 | A | 10/1987 | Howard |
| 4,706,282 | A | 11/1987 | Knowd |
| 4,723,302 | A | 2/1988 | Fulmer et al. |
| 4,729,398 | A | 3/1988 | Benson et al. |
| 4,739,398 | A | 4/1988 | Thomas et al. |
| 4,750,173 | A | 6/1988 | Bluthgen |
| 4,755,871 | A | 7/1988 | Morales-Garza et al. |
| 4,755,884 | A | 7/1988 | Efron et al. |
| 4,764,608 | A | 8/1988 | Masuzawa et al. |
| 4,764,808 | A | 8/1988 | Solar |
| 4,789,863 | A | 12/1988 | Bush |
| 4,805,020 | A | 2/1989 | Greenberg |
| 4,807,013 | A | 2/1989 | Manocha |
| 4,807,031 | A | 2/1989 | Broughton et al. |
| 4,840,602 | A | 6/1989 | Rose |
| 4,843,562 | A | 6/1989 | Kenyon et al. |
| 4,876,617 | A | 10/1989 | Best et al. |
| 4,876,736 | A | 10/1989 | Kiewit |
| 4,930,011 | A | 5/1990 | Kiewit |
| 4,931,871 | A | 6/1990 | Kramer |
| 4,937,807 | A | 6/1990 | Weitz et al. |
| 4,939,515 | A | 7/1990 | Adelson |
| 4,943,963 | A | 7/1990 | Waechter et al. |
| 4,945,412 | A | 7/1990 | Kramer |
| 4,967,273 | A | 10/1990 | Greenberg |
| 4,969,041 | A | 11/1990 | O'Grady et al. |
| 4,972,471 | A | 11/1990 | Gross et al. |
| 4,972,503 | A | 11/1990 | Zurlinden |
| 4,979,210 | A | 12/1990 | Nagata et al. |
| 5,057,915 | A | 10/1991 | Von Kohorn |
| 5,073,925 | A | 12/1991 | Nagata et al. |
| 5,080,479 | A | 1/1992 | Rosenberg |
| 5,113,437 | A | 5/1992 | Best et al. |
| 5,116,437 | A | 5/1992 | Yamamoto et al. |
| 5,161,251 | A | 11/1992 | Mankovitz |
| 5,191,615 | A | 3/1993 | Aldava et al. |
| 5,200,822 | A | 4/1993 | Bronfin et al. |
| 5,210,820 | A | 5/1993 | Kenyon |
| 5,210,831 | A | 5/1993 | Emma et al. |
| 5,213,337 | A | 5/1993 | Sherman |
| 5,214,792 | A | 5/1993 | Alwadish |
| 5,237,611 | A | 8/1993 | Rasmussen et al. |
| 5,251,041 | A | 10/1993 | Young et al. |
| 5,270,480 | A | 12/1993 | Hikawa |
| 5,294,962 | A | 3/1994 | Sato et al. |
| 5,294,982 | A | 3/1994 | Salomon et al. |
| 5,319,453 | A | 6/1994 | Copriviza et al. |
| 5,319,735 | A | 6/1994 | Preuss et al. |
| 5,351,304 | A | 9/1994 | Yamamoto |
| 5,379,345 | A | 1/1995 | Greenberg |
| 5,402,488 | A | 3/1995 | Karlock |
| 5,404,160 | A | 4/1995 | Schober et al. |
| 5,404,377 | A | 4/1995 | Moses |
| 5,408,258 | A | 4/1995 | Kolessar |
| 5,414,729 | A | 5/1995 | Fenton |
| 5,424,785 | A | 6/1995 | Orphan |
| 5,425,100 | A | 6/1995 | Thomas et al. |
| 5,432,799 | A | 7/1995 | Shimpuku et al. |
| 5,436,653 | A | 7/1995 | Ellis et al. |
| 5,450,490 | A | 9/1995 | Jensen et al. |
| 5,452,901 | A | 9/1995 | Nakada et al. |
| 5,473,631 | A | 12/1995 | Moses |
| 5,481,294 | A | 1/1996 | Thomas et al. |
| 5,497,372 | A | 3/1996 | Nankoh et al. |
| 5,502,576 | A | 3/1996 | Ramsay et al. |
| 5,504,518 | A | 4/1996 | Ellis et al. |
| 5,508,754 | A | 4/1996 | Orphan |
| 5,519,454 | A | 5/1996 | Willis |
| 5,523,794 | A | 6/1996 | Mankovitz et al. |
| 5,526,427 | A | 6/1996 | Thomas et al. |
| 5,537,484 | A | 7/1996 | Kobayashi |
| 5,579,124 | A | 11/1996 | Aijala et al. |
| 5,581,658 | A | 12/1996 | O'Hagan et al. |
| 5,581,800 | A | 12/1996 | Fardeau et al. |
| 5,592,553 | A | 1/1997 | Guski et al. |
| 5,612,729 | A | 3/1997 | Ellis et al. |
| 5,613,004 | A | 3/1997 | Cooperman et al. |
| 5,636,292 | A | 6/1997 | Rhoads |
| 5,664,018 | A | 9/1997 | Leighton |
| 5,687,191 | A | 11/1997 | Lee et al. |
| 5,687,236 | A | 11/1997 | Moskowitz et al. |
| 5,699,427 | A | 12/1997 | Chow et al. |
| 5,719,619 | A | 2/1998 | Hattori et al. |
| 5,719,937 | A | 2/1998 | Warren et al. |
| 5,737,329 | A | 4/1998 | Horiguchi |
| 5,752,880 | A | 5/1998 | Gabai et al. |
| 5,761,606 | A | 6/1998 | Wolzien |
| 5,764,763 | A | 6/1998 | Jensen et al. |
| 5,778,108 | A | 7/1998 | Coleman, Jr. |
| 5,787,334 | A | 7/1998 | Fardeau et al. |
| 5,805,635 | A | 9/1998 | Andrews, Jr. et al. |
| 5,809,064 | A | 9/1998 | Fenton et al. |
| 5,809,139 | A | 9/1998 | Girod et al. |
| 5,819,289 | A | 10/1998 | Sanford, II et al. |
| 5,822,360 | A | 10/1998 | Lee et al. |
| 5,822,432 | A | 10/1998 | Moskowitz et al. |
| 5,825,892 | A | 10/1998 | Braudaway et al. |
| 5,828,325 | A | 10/1998 | Wolosewicz et al. |
| 5,832,119 | A | 11/1998 | Rhoads |
| 5,841,978 | A | 11/1998 | Rhoads |
| 5,848,155 | A | 12/1998 | Cox |
| 5,850,249 | A | 12/1998 | Massetti et al. |
| 5,850,481 | A | 12/1998 | Rhoads |
| 5,862,260 | A | 1/1999 | Rhoads |
| 5,870,030 | A | 2/1999 | DeLuca et al. |
| 5,887,243 | A | 3/1999 | Harvey et al. |
| 5,889,868 | A | 3/1999 | Moskowitz et al. |
| 5,892,900 | A | 4/1999 | Ginter et al. |
| 5,893,067 | A | 4/1999 | Bender et al. |
| 5,901,178 | A | 5/1999 | Lee et al. |
| 5,905,800 | A | 5/1999 | Moskowitz et al. |
| 5,930,369 | A | 7/1999 | Cox et al. |
| 5,933,798 | A | 8/1999 | Linnartz |
| 5,937,000 | A | 8/1999 | Lee et al. |

(56) References Cited

U.S. PATENT DOCUMENTS

| | | |
|---|---|---|
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,405 B1 | 6/2004 | Muratani et al. |
| 6,757,908 B1 | 6/2004 | Vogel |
| 6,760,463 B2 | 7/2004 | Rhoads |
| 6,768,807 B2 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,810,527 B1 | 10/2004 | Conrad et al. |
| 6,823,455 B1 | 11/2004 | Macy et al. |
| 6,829,368 B2 | 12/2004 | Meyer et al. |
| 6,829,582 B1 | 12/2004 | Barsness |
| 6,834,344 B1 | 12/2004 | Aggarwal et al. |
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |

(56) References Cited

U.S. PATENT DOCUMENTS

| | | |
|---|---|---|
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 | 9/2005 | Epstein |
| 6,947,571 B1 | 9/2005 | Rhoads et al. |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,123,718 B1 | 10/2006 | Moskowitz et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,369,678 B2 | 5/2008 | Rhoads |
| 7,389,421 B2 | 6/2008 | Kirovski et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,756,272 B2 | 7/2010 | Kocher et al. |
| 7,788,684 B2 | 8/2010 | Petrovic et al. |
| 7,788,693 B2 | 8/2010 | Robbins |
| 7,818,763 B2 * | 10/2010 | Sie et al. ................... 725/32 |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,138,930 B1 | 3/2012 | Heath |
| 8,151,113 B2 | 4/2012 | Rhoads |
| 8,155,463 B2 | 4/2012 | Wong et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,315,835 B2 | 11/2012 | Tian et al. |
| 8,346,532 B2 | 1/2013 | Chakra et al. |
| 8,467,717 B2 | 6/2013 | Croy et al. |
| 8,538,066 B2 | 9/2013 | Petrovic et al. |
| 8,589,969 B2 | 11/2013 | Falcon |
| 2001/0001159 A1 | 5/2001 | Ford |
| 2001/0021926 A1 | 9/2001 | Schneck et al. |
| 2001/0022786 A1 | 9/2001 | King et al. |
| 2001/0025341 A1 | 9/2001 | Marshall |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0010684 A1 | 1/2002 | Moskowitz |
| 2002/0012443 A1 | 1/2002 | Rhoads et al. |
| 2002/0019769 A1 * | 2/2002 | Barritz et al. ................... 705/14 |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone, Jr. et al. |
| 2003/0056213 A1 | 3/2003 | McFaddin et al. |
| 2003/0061489 A1 | 3/2003 | Pelly et al. |
| 2003/0063747 A1 | 4/2003 | Petrovic |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |

(56) References Cited

U.S. PATENT DOCUMENTS

| | | |
|---|---|---|
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2004/0260930 A1 | 12/2004 | Malik et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0071283 A1 | 3/2005 | Randle et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2005/0267928 A1 | 12/2005 | Anderson et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1* | 9/2007 | Postrel ............................ 705/14 |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0219643 A1 | 9/2008 | Le Buhan et al. |
| 2008/0228733 A1 | 9/2008 | Davis et al. |
| 2008/0273861 A1 | 11/2008 | Yang et al. |
| 2008/0298632 A1 | 12/2008 | Reed |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0158318 A1* | 6/2009 | Levy .............................. 725/32 |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0011217 A1 | 1/2010 | Tachibana et al. |
| 2010/0034513 A1 | 2/2010 | Nakano et al. |
| 2010/0069151 A1 | 3/2010 | Suchocki |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2010/0332723 A1 | 12/2010 | Lin et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0202687 A1 | 8/2011 | Glitsch et al. |
| 2011/0209191 A1 | 8/2011 | Shah |
| 2011/0214044 A1 | 9/2011 | Davis et al. |
| 2011/0214143 A1 | 9/2011 | Rits et al. |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0023595 A1 | 1/2012 | Speare et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |
| 2012/0203556 A1 | 8/2012 | Villette et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300977 A1 | 11/2012 | Petrovic et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0011006 A1 | 1/2013 | Petrovic et al. |
| 2013/0031579 A1* | 1/2013 | Klappert ........................ 725/32 |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1 | 5/2013 | Lee et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1* | 6/2013 | Petrovic et al. ................. 726/26 |
| 2013/0283402 A1 | 10/2013 | Petrovic |
| 2013/0339029 A1 | 12/2013 | Petrovic et al. |
| 2014/0029786 A1 | 1/2014 | Winograd |

(56) References Cited

U.S. PATENT DOCUMENTS

| | | |
|---|---|---|
| 2014/0067950 A1 | 3/2014 | Winograd |
| 2014/0071342 A1 | 3/2014 | Winograd et al. |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0229963 A1 | 8/2014 | Petrovic et al. |
| 2014/0237628 A1 | 8/2014 | Petrovic |
| 2014/0267907 A1 | 9/2014 | Downes et al. |
| 2014/0270337 A1 | 9/2014 | Zhao et al. |
| 2014/0270338 A1 | 9/2014 | Zhao et al. |
| 2014/0279296 A1 | 9/2014 | Petrovic et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2014/0355817 A1 | 12/2014 | Wong et al. |

FOREIGN PATENT DOCUMENTS

| | | |
|---|---|---|
| EP | 372601 | 6/1990 |
| EP | 581317 | 2/1994 |
| EP | 1137250 | 9/2001 |
| EP | 2166725 | 3/2010 |
| EP | 2605485 | 6/2013 |
| EP | 2653964 | 10/2013 |
| EP | 2782337 | 9/2014 |
| GB | 2260246 | 4/1993 |
| GB | 2292506 | 2/1996 |
| GB | 2358313 | 7/2001 |
| GB | 2363027 | 12/2001 |
| JP | 10-150548 | 6/1998 |
| JP | 11-086435 | 3/1999 |
| JP | 11-284516 | 10/1999 |
| JP | 11346302 | 12/1999 |
| JP | 2000083159 | 3/2000 |
| JP | 2000163870 | 6/2000 |
| JP | 2000174628 | 6/2000 |
| JP | 2000216981 | 8/2000 |
| JP | 2000069273 | 11/2000 |
| JP | 2001022366 | 1/2001 |
| JP | 2001119555 | 4/2001 |
| JP | 2001175270 | 6/2001 |
| JP | 2001188549 | 7/2001 |
| JP | 2001216763 | 8/2001 |
| JP | 2001218006 | 8/2001 |
| JP | 2001245132 | 9/2001 |
| JP | 2001257865 | 9/2001 |
| JP | 2001312570 | 11/2001 |
| JP | 2001339700 | 12/2001 |
| JP | 2001527660 | 12/2001 |
| JP | 2002010057 | 1/2002 |
| JP | 2002024095 | 1/2002 |
| JP | 2002027223 | 1/2002 |
| JP | 2002091465 | 3/2002 |
| JP | 2002091712 | 3/2002 |
| JP | 2002100116 | 4/2002 |
| JP | 2002125205 | 4/2002 |
| JP | 2002135557 | 5/2002 |
| JP | 2002165191 | 6/2002 |
| JP | 2002176614 | 6/2002 |
| JP | 2002519916 | 7/2002 |
| JP | 2002232412 | 8/2002 |
| JP | 2002319924 | 10/2002 |
| JP | 2003008873 | 1/2003 |
| JP | 2003039770 | 2/2003 |
| JP | 2003091927 | 3/2003 |
| JP | 2003134461 | 5/2003 |
| JP | 2003230095 | 8/2003 |
| JP | 2003244419 | 8/2003 |
| JP | 2003283802 | 10/2003 |
| JP | 2003316556 | 11/2003 |
| JP | 2003348324 | 12/2003 |
| JP | 2004023786 | 1/2004 |
| JP | 2004070606 | 3/2004 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20080539669 | 11/2008 |
| JP | 20100272920 | 12/2010 |
| JP | 5283732 | 7/2013 |
| KR | 1020080087047 | 9/2008 |
| KR | 20100009384 | 1/2010 |
| KR | 1020120128149 | 11/2012 |
| WO | 9410771 | 5/1994 |
| WO | 9514289 | 5/1995 |
| WO | 9709797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 9962022 | 12/1999 |
| WO | 00-00969 | 1/2000 |
| WO | 00-13136 | 3/2000 |
| WO | 0056059 | 9/2000 |
| WO | 0150665 | 7/2001 |
| WO | 0154035 | 7/2001 |
| WO | 01-55889 | 8/2001 |
| WO | 0197128 | 12/2001 |
| WO | 0219589 | 3/2002 |
| WO | 0223883 | 3/2002 |
| WO | 0249363 | 6/2002 |
| WO | 0295727 | 11/2002 |
| WO | 03052598 | 6/2003 |
| WO | 03102947 | 12/2003 |
| WO | 2005017827 | 2/2005 |
| WO | 2005027501 | 3/2005 |
| WO | 2005038778 | 4/2005 |
| WO | 2006051043 | 2/2006 |
| WO | 2006116394 | 11/2006 |
| WO | 2010073236 | 7/2010 |
| WO | 2011116309 | 9/2011 |
| WO | 2013067439 | 5/2013 |
| WO | 2013090462 | 6/2013 |
| WO | 2013090466 | 6/2013 |
| WO | 2013090467 | 6/2013 |
| WO | 2014144101 | 9/2014 |
| WO | 2014153199 | 9/2014 |
| WO | 2014160324 | 10/2014 |

OTHER PUBLICATIONS

Wang, X., et al., "Robust correlation of encrypted attack traffic through stepping stones by manipulation of interpacket delays," Proceedings of the 10th ACM conference on computer communications security, Oct. 27-30, 2003, Washington D.C., USA.

Wolfgang, R., et al., "Perceptual watermarks for digital images and video," Proceedings of the IEEE, 87(7):1108-1126, Jul. 1999.

Xu, C., et al., "Applications of digital watermarking technology in audio signals," Journal of Audio Eng. Soc., 10(47):805-812, Oct. 1999.

Yeung, M. M., et al., "An invisible watermarking technique for image verification," Image Processing, International Conference Proceedings, 2:680-683, Oct. 26-29, 1997.

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

"Advanced Access Content System (AACS), Pre-recorded Video Book," Revision 0.951, Sep. 2009 (86 pages).

"Civolution's 2nd screen synchronisation solution wins CSI product of the year 2011 award at IBC," IBC Press Release, Hall 2—Stand C30, Sep. 2011 (2 pages).

(56) References Cited

OTHER PUBLICATIONS

"Content Protection—Self Protecting Digital Content," http://www.cryptography.com/technology/spdc/index.html, May 2010 (1 page).
"Red Bee and Civolution develop companion app for FX UK," http://www.digitaltveurope.net/19981/red-bee-and-civolution-develop-companion-app-for-fx-uk, Jan. 2012 (2 pages).
"Microsoft response to CfP for technology solutions to screen digital audio content for LCM acceptance," Microsoft Corporation, May 23, 1999 (9 pages).
"TASK AC122-copy protection for distribution services," Http://acad.bg/WISE/english/rd/partners/acts/areal/ac122-t. html, Jul. 1, 1997 (2 pages).
Adelsbach, A., et al., "Proving Ownership of Digital Content," Proc. 3rd Int. Workshop on Information Hiding, 1768:117-133, Sep. 1999.
Aggarwal, A., et al., "Multi-Layer Grid Embeddings," Foundations of Computer Science, 26th Annual Symposium on Foundations of Computer Science, 85:186-196, Oct. 1985.
Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," IEEE Africon, pp. 293-298, 2002.
Barreto, P.S.L.M., et al. "Toward Secure Public-Key Blockwise Fragile Authentication Watermarking," IEEE Proceedings Vision, Image, and Signal Processing, 149(2):57-62, Apr. 2002.
Boney, L., et al., "Digital Watermarks for Audio Signals," Dept. of Electrical Engineering, Univ. of Minnesota, Mar. 1996 (4 pages).
Cappellini, V., et al. "Robust Frame-based Watermarking for Digital Video," Proceedings of the 12th International Workshop on Database and Expert Systems Applications, Sep. 2001 (5 pages).
Caronni, G., "Assuring Ownership Rights for Digital Images," Proceedings of reliable IT systems VIS 95, Vieweg Publishing Company, Germany, 1995 (10 pages).
Chen, B et al., "Quantization index modulation: a class of provably good methods for digital watermarking and information embedding," IEEE Transactions on Information Theory, 47(4):1423-1443 May 2001.
Chou, J., et al., "A Robust Blind Watermarking Scheme based on Distributed Source Coding Principles," Multimedial 2000 Proceedings of the eighth ACM international conference on multimedia, Los Angeles, California, 2000 (8 pages).
Chou, J., et al., "A Robust Optimization Solution to the Data Hiding Problem using Distributed Source Coding Principles," Pro. SPIE, 3971, San Jose, California, Jan. 2000 (10 pages).
Cinea, Inc., "Forensic watermarking deterring video piracy," 2004, (9 pages). [http://www.cinea.com/whitepapers/forensic_watermarking.pdf].
Costa, M., "Writing on Dirty Paper," IEEE Trans. on Info. Theory, 29(3):439-441, May 1983.
Cox, I. J., et al., "Some general methods for tampering with watermarks," IEEE Journal on Selected Areas in Communications, 16(4): 587-593, May 1998.
Coxford, A., et al., "Advanced Mathematics: A Preparation for Calculus, Second Edition," Harcourt Brace Jovanovish, Inc., 1978 (14 pages).
Das, et al., "Distributed Priority Queues on Hybercube Architectures," IEEE, 1996, pp. 620-627.
Davidson, M.F., "Music File Filter," Sony Music, New York, May 23, 1999 (2 pages).
Digimarc Corporation, "Digimarc Watermarking Guide," 1999 (22 pages).
Dittmann, J., "Combining digital watermarks and collusion secure fingerprints for customer copy monitoring," Proc. IEEE Seminar on Secure Images and Image Authentication, Apr. 2000 (6 pages).
Dittmann, J., et al., "Combining digital watermarks and collusion secure fingerprints for digital images," Proc. SPIE 3657:171-182, Jan. 1999 (12 pages).
Epp, L.W., et al., "Generalized scattering matrices for unit cell characterization of grid amplifiers and device de-embedding," IEEE, 2:1288-1291, Jun. 1995.

European Search Report dated Apr. 12, 2012 for European Patent Application No. 07836262.1 filed Jul. 25, 2007 (12 pages).
European Search Report dated Jul. 3, 2012 for European Patent Application No. 12150742.0, filed Oct. 7, 2003 (5 pages).
European Search Report dated Nov. 10, 2010 for European Patent Application No. 03774648.4, filed Oct. 7, 2003 (5 pages).
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
European Search Report dated Nov. 8, 2012 for European Patent Application No. 06785709.4, filed Jun. 27, 2006 (5 pages).
Furon, T., et al., "An asymmetric watermarking method," IEEE Trans. Signal Processing, 4(51):981-995, Apr. 2003.
Guth, H.J., et al., "Error- and collusion-secure fingerprinting for digital data," Proc. 3rd Int. Workshop on Information Hiding, LNCS 1768:134-145, Sep./Oct. 1999.
Hartung, F., et al., "Digital watermarking of MPEG-2 coded video in the bitstream domain," Proc. IEEE Int. Conf. on Acoustics, Speech and Signal Processing, 4:2621-2624, Apr. 1997.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
Heegard, C., et al., "On the capacity of computer memory with defects," IEEE Trans. Info. Theory, 5(IT-29):731-739, Sep. 1983.
International Search Report and Written Opinion dated Apr. 8, 2013 for International Application No. PCT/US2012/069306, filed Dec. 12, 2012 (12 pages).
International Search Report and Written Opinion dated Mar. 25, 2013 for International Application No. PCT/US2012/069302, filed Dec. 12, 2012 (22 pages).
International Search Report and Written Opinion dated Apr. 24, 2012 for International Application No. PCT/US2011/051857, filed Sep. 15, 2011 (9 pages).
International Search Report and Written Opinion dated Aug. 14, 1998 for International Application No. PCT/US1998/009587, filed May 12, 1998 (3 pages).
International Search Report and Written Opinion dated Aug. 22, 2007 for International Application No. PCT/US2006/031267, filed Aug. 9, 2006 (2 pages).
International Search Report and Written Opinion dated Feb. 14, 2002 for International Application No. PCT/US2001/026505, filed Aug. 27, 2001 (2 pages).
International Search Report and Written Opinion dated Feb. 28, 2013 for International Application No. PCT/US2012/066138, filed Nov. 20, 2012 (11 pages).
International Search Report and Written Opinion dated Jan. 4, 2008 for International Application No. PCT/US2006/015615, filed Apr. 25, 2006 (5 pages).
International Search Report and Written Opinion dated Mar. 14, 2013 for International Application No. PCT/US2012/069308, filed Dec. 12, 2012 (10 pages).
International Search Report and Written Opinion dated Mar. 28, 2012 for International Application No. PCT/US2011/051855, filed Sep. 15, 2011 (8 pages).
International Search Report and Written Opinion dated May 13, 2008 for International Application No. PCT/US2006/025090, filed Jun. 27, 2006 (2 pages).
International Search Report and Written Opinion dated May 19, 2004 for International Application No. PCT/US2003/031816, filed Apr. 29, 2004 (3 pages).
International Search Report and Written Opinion dated May 29, 2008 for International Application No. PCT/US2006/015410, filed Apr. 21, 2006 (6 pages).
International Search Report and Written Opinion dated Sep. 26, 2008 for International Application No. PCT/US2007/016812, filed Jul. 25, 2007 (6 pages).
International Search Report and Written Opinion dated Mar. 18, 2013 for International Application No. PCT/US2012/063431, filed Nov. 2, 2012 (10 pages).

(56) References Cited

OTHER PUBLICATIONS

Jacobsmeyer, J., et al., "Introduction to error-control coding," Pericle Communications Company, 2004 (16 pages).
Kalker, T., et al., "A security risk for publicly available watermark detectors," Proc. Benelux Info. Theory Symp., Veldhoven, The Netherlands, May 1998 (7 pages).
Kalker, T., et al., "System issues in digital image and video watermarking for copy protection," Proc. IEEE Int. Conf. on Multimedia Computing and Systems, pp. 562-567, Jun. 1999.
Kang, X., et al., "A DWT-DFT composite watermarking scheme robust to both affine transform and JPEG compression," IEEE Transactions on Circuits and Systems for Video Technology, 8(13):776-786 Aug. 2003.
Kim, T.Y., et al., "An asymmetric watermarking system with many embedding watermarks corresponding to one detection watermark," IEEE Signal Processing Letters, 3(11):375-377, Mar. 2004.
Kirovski, D., et al., "Multimedia content screening using a dual watermarking and fingerprinting system," Proceedings of the tenth ACM international conference, pp. 372-381, 2002.
Kirovski, D., et al., "Randomizing the replacement attack," ICASSP, pp. 381-384, 2004.
Kirovski, D., et al., "Robust spread-spectrum audio watermarking," IEEE International Conference on Acoustics, Speech, and Signal Processing, 3:1345-1348, 2001.
Kirovski, D., et al., "Multimedia content screening using a dual watermarking and fingerprinting system," Multimedia '02 Proceedings of the tenth ACM international conference on Multimedia, 2002 (11 pages).
Kocher, P., et al., "Self-Protecting Digital Content: A Technical Report from the CRI Content Security Research Initiative," Cryptography Research, Inc. (CRI), 2002-2003 (14 pages).
Kutter, M., et al., "The watermarkcopy attack," Proc. of the SPIE: Security and Watermarking of Multimedia Content II, 3971:1-10, Jan. 2000.
Kuznetsov, A.V., et al., "An error correcting scheme for defective memory," IEEE Trans. Inf. Theory, 6(4):712-718, Nov. 1978 (7 pages).
Lacy, J., et al., "Intellectual property protection systems and digital watermarking," Proceedings: Information Hiding, Second International Workshop, Portland, Oregon, pp. 158-168, 1998.
Lin, E.T., et al., "Detection of image alterations using semi-fragile watermarks," Proceedings of the SPIE International Conference on Security and Watermarking of Multimedia Contents II, Jan. 2000 (12 pages).
Lin, P.L., et al., "Robust transparent image watermarking system with spatial mechanisms," The Journal of Systems and Software, 50:107-116, Feb. 2000.
Lotspeich, J., "The Advanced Access Content System's Use of Digital Watermarking," MCPS '06, Oct. 28, 2006, pp. 19-21.
Lu, C.S., et al., "Oblivious cocktail watermarking by sparse code shrinkage: A regional-and global-based scheme," IEEE Transactions on Multimedia, 4(2):209-224, Dec. 2000.
Maehara, F., et al., "A proposal of multimedial home education terminal system based on flash-squeak OS," Technical report of the institute of image information and television engineers, 28(43):21-24, Jul. 2004.
Mason, A. J., et al., "User requirements for watermarking in broadcast applications," IEEE Conference Publication, International Broadcasting Convention (BC 2000), Amsterdam, Sep. 8-12, 2000 (7 pages).
Mintzer, F., et al., "If one watermark is good, are more better?," Acoustics, Speech, and Signal Processing, ICASSP, 4:2067-2069, Mar. 1999.
Mobasseri, B.G., et al. "Content authentication and tamper detection in digital video," Image Processing Proceedings, International Conference, 1:458-461, 2000.
Moulin, P., et al., "Detection-theoretic analysis of desynchronization attacks in watermarking," Technical Report MSR-TR-2002-24, Microsoft Corporation, Mar. 2002.
Muranoi, R., et al., "Video retrieval method using shotID for copyright protection systems," Proc. SPIE Multimedia Storage and Archiving Systems III, 3527:245-252, Nov. 1998.
Nikolaidis, N., et al., "Watermark detection: benchmarking perspectives," 2002 IEEE Conference on Multimedia and Expo, 2002 (4 pages).
Office Action dated Jul. 21, 2011 for Japanese Patent Application No. 2008-508985 (6 pages).
Office Action dated Mar. 16, 2012 for Japanese Patent Application No. 2008-508985 (8 pages).
Office Action dated Mar. 18, 2011 for European Patent Application No. 03774648.4 (6 pages).
Office Action dated May 8, 2012 for Japanese Patent Application No. 2009-522802 (4 pages).
Office Action dated Nov. 26, 2012 for Japanese Patent Application No. 2011-114667 (8 pages).
Office Action dated May 1, 2013 for Japanese Patent Application No. 2011-114667 (6 pages).
Office Action dated Nov. 28, 2012 for Japanese Patent Application No. 2011-114666 (8 pages).
Park, J.H., et al., "Robust and fragile watermarking techniques for documents using bidirectional diagonal profiles," Information and Communications Security: Third International Conference, Xian, China, Nov. 2001, pp. 483-494.
Perez-Gonzalez, F., et al., "Approaching the capacity limit in image watermarking a perspective on coding techniques for data hiding applications," Signal Processing, 6(81):1215-1238 Jun. 2001.
Petitcolas, F., et al., "The blind pattern matching attack on watermark systems," IEEE Trans. SignalProcessing, Apr. 2003 (4 pages).
Petitcolas, F.A.P., et al., "Attackson copyright marking systems," Second Workshop on Information Hiding, Lecture Notes in Computer Science, Portland, Oregon, pp. 218-238, Apr. 1998.
Philips Research Liquid Audio Fraunhofer Institute, "Digital Audio Screening Technology for Phased Rollout," Version 1.00, May 1999 (38 pages).
Pytlak, J.,"Anti-piracy coding," http://www.tele.com/pipermail/tig/2003-November/003842.html, Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).
Seok, J., et al., "A novel audio watermarking algorithm for copyright protection of digital audio," ETRI Journal, 24(3):181-189, Jun. 2002.
Shih, F.Y., et al., "Combinational, image watermarking in the spatial and frequency domains," Pattern Recognition, 36:696-975, May 2002.
Solanki, K., et al., "Robust image-adaptive data hiding: modeling, source coding and channel coding", 41st Allerton Conference on Communications, Control and Computing, Oct. 2003 (10 pages).
Spangler, T., "Social Science," http://www.multichannel.com/content/social-science, Sep. 2011 (5 pages).
Steinebach, M., et al., "StirMark benchmark: audio watermarking attacks," International Conference on Information Technology: Coding and Computing (ITCC 2001), Las Vegas, Nevada, Apr. 2001 (6 pages).
Tanaka, K., et al., "Secret transmission method of character data in motion picture communication," SPIE Visual Communications and Image Processing '91, 1605:646-649, 1991.
Tsai, M.J., et al., "Wavelet packet and adaptive spatial transformation of watermark for digital image authentication," IEEE Image Processing, 2000 International Conference, 1:450-453, 2000 (4 pages).
Office Action dated Jan. 20, 2014 for Japanese Patent Application No. 2013-036990 (6 pages).
European Search Report dated Oct. 14, 2014 for European Patent Application No. 14173053.1, filed Oct. 7, 2003 (5 pages).
International Search Report and Written Opinion dated Sep. 12, 2014 for International Application No. PCT/US2014/035474, filed Apr. 25, 2014 (17 pages).
International Search Report and Written Opinion dated Sep. 15, 2014 for International Application No. PCT/US2014/035539, filed Apr. 25, 2014 (16 pages).

(56) References Cited

OTHER PUBLICATIONS

International Search Report and Written Opinion dated Aug. 25, 2014 for International Application No. PCT/US2014/029564, filed Mar. 14, 2014 (10 pages).
International Search Report and Written Opinion dated Aug. 25, 2013 for International Application No. PCT/US2014/026322, filed Aug. 25, 2014 (12 pages).
International Search Report and Written Opinion dated Aug. 8, 2014 for International Application No. PCT/US2014/028372, filed Mar. 14, 2014 (18 pages).
International Search Report and Written Opinion dated Nov. 11, 2014 for International Application No. PCT/US2014/047840, filed Jul. 23, 2014 (15 pages).
Office Action dated Oct. 30, 2014 for Korean Patent Application No. 10-2013-7009718 (8 pages).

\* cited by examiner

ENHANCED CONTENT DISTRIBUTION USING ADVERTISEMENTS

RELATED APPLICATIONS

This patent application claims the benefit of priority to U.S. Provisional Patent Application No. 61/700,830 filed on Sep. 13, 2012, which is incorporated herein by reference in its entirety for all purposes.

FIELD OF INVENTION

The present application generally relates to the field of multimedia content presentation and advertisement.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content.

A multimedia content, such as an audiovisual content, often consists of a series of related images which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc. In some scenarios, such a multimedia content, or portions thereof, may contain only one type of content, including, but not limited to, a still image, a video sequence and an audio clip, while in other scenarios, the multimedia content, or portions thereof, may contain two or more types of content.

SUMMARY

The disclosed embodiments relate to methods, devices and computer program products that facilitate enhanced use and interaction with a multimedia content, and presentation and consumption of advertisements at a compliant device.

One aspect of the disclosed embodiments relates to a method that includes receiving an indication at a compliant device that an entertainment content is associated with a content policy information. The content policy information relates to presentation of one or more advertisements during, or prior to, presentation of the entertainment content. Further, the content policy information is ascertained through one or both of (a) extraction of watermarks embedded in the one or more advertisements or the entertainment content and (b) computation and matching of fingerprints associated with the one or more advertisements or the entertainment content. The above noted method also includes receiving an indication that the entertainment content is associated with an advertisement award program, and providing an advertisement award program message indicating that modified presentation of the one or more advertisements is allowed in exchange for a specific number of award points of an advertisement award program. Additionally, upon receiving an indication that modified presentation of the one or more advertisements in exchange for the specific number of award points is desired, the method includes allowing the one or more advertisements to be presented in a modified form.

In one example embodiment, the content policy information is indicative that presentation of the one or more advertisements cannot be modified without receiving further input from a user or from a user device. In another example embodiment, the advertisement award program is associated with one of: a user, and the compliant device. According to yet another example, embodiment, the above noted method further comprises receiving identification information associated with a user or with the compliant device to enable access to award points of the advertisement award program associated with the user or with the compliant device. In still another embodiment, the above noted method further includes accumulating further award points in return for one or more of the following: presentation of one or more un-modified advertisements, purchase of one or more specific entertainment contents, and purchase of at least some of the specific number of award points.

In another example embodiment, the above noted method additionally includes accumulating further award points in return for presentation of one or more unmodified advertisements on each of a plurality of devices associated with a user. In one example embodiment, modified presentation of the one or more advertisements includes one or more of: shortened presentation of the one or more advertisements and skipping of the one or more advertisements. In another example embodiment, the above noted method further includes, upon receiving an indication that modified presentation of the one or more advertisements in exchange for the specific number of award points is not desired, presenting a message indicating that presentation of the entertainment content is allowed upon an agreement to view the one or more advertisement in unmodified format, and upon receiving an indication as to an agreement to view the one or more advertisements in unmodified format, presenting the one or more advertisements without modification.

According to another exemplary embodiment, the above noted method also includes, upon receiving an indication that modified presentation of the one or more advertisements in exchange for the specific number of award points is not desired, presenting a message indicating that presentation of the entertainment content is allowed upon an agreement to view the one or more advertisement in unmodified format, and upon receiving an indication as a lack of an agreement to view the one or more advertisements in unmodified format, providing a command to stop or prevent presentation of the entertainment content. In yet another exemplary embodiment, the advertisement award program is owned by a particular entity, and award points of the advertisement award program are redeemable through other entities affiliated with the particular entity. For example, the particular entity can be selected as one of: an advertiser, a television network, an entertainment content owner, and a content distributor.

In one exemplary embodiment, the advertisement award program is identified at least in-part by identifying the entertainment content using one or more of the following: (A) watermarks that are embedded in the entertainment content, (B) watermarks that are embedded in the one or more advertisements, (C) fingerprints that are computed based on the entertainment content, and (D) fingerprints that are computed based on the one or more advertisements.

According to another example embodiment, the content policy information is associated with a specific aspect of the entertainment content, the specific aspect comprising one or more of: a rights holder of the entertainment content, a distribution channel of the entertainment content, a platform on which the entertainment content is presented, a genre of the entertainment content, a release window of the entertainment content, and a format of the entertainment content. Additionally, in this exemplary embodiment, the one or more advertisements in modified form are presented before allowing or resuming presentation of each entertainment content having the same specific aspect. In one exemplary embodiment, the rights holder of the entertainment content includes one of a creator and a distributor of the entertainment content. In another exemplary embodiment, the distribution channel includes one an over-the-top (OTT), over-the-air, video on demand (VOD), satellite, cable, wireless and Internet distribution channels. In still another exemplary embodiment, the platform includes one of a mobile, desktop, and television platforms.

Another aspect of the disclosed embodiments relates to a device that includes a receiver configured to receive one or both of (a) an entertainment content and (b) one or more advertisements. Such a device further includes a processor that is configured to receive an indication that an entertainment content is associated with a content policy information, the content policy information relating to presentation of one or more advertisements during, or prior to, presentation of the entertainment content. The content policy information ascertained through one or both of (A) watermarks embedded in the one or more advertisements or the entertainment content, and (B) computation of fingerprints associated with the one or more advertisements or the entertainment content. The processor in such a device is also configured to receive an indication that the entertainment content is associated with an advertisement award program, to provide an advertisement award program message indicating that modified presentation of the one or more advertisements is allowed in exchange for a specific number of award points of an advertisement award program, and, upon receiving an indication that modified presentation of the one or more advertisements in exchange for the specific number of award points is desired, to allow the one or more advertisements to be presented in a modified form.

In one exemplary embodiment, the content policy information is indicative that presentation of the one or more advertisements cannot be modified without receiving further input. In another exemplary embodiment, the processor is further configured to receive identification information associated with a user or with the device to enable access to award points of the advertisement award program associated with the user or the device. In still another exemplary embodiment, the processor is further configured to accumulate further award points in return for one or more of the following: presentation of one or more un-modified advertisements, purchase of one or more specific entertainment contents, and purchase of at least some of the specific number of award points.

According to another exemplary embodiment, the processor is further configured to, upon receiving an indication that modified presentation of the one or more advertisements in exchange for the specific number of award points is not desired, present a message indicating that presentation of the entertainment content is allowed upon an agreement to view the one or more advertisement in unmodified format. In this embodiment, the processor is additionally configured to, upon receiving an indication as to an agreement to view the one or more advertisements in unmodified format, present the one or more advertisements without modification.

In one example embodiment, the processor is further configured to, upon receiving an indication that modified presentation of the one or more advertisements in exchange for the specific number of award points is not desired, present a message indicating that presentation of the entertainment content is allowed upon an agreement to view the one or more advertisement in unmodified format. In this exemplary embodiment, the processor is also configured to, upon receiving an indication as to a lack of an agreement to view the one or more advertisements in unmodified format, provide a command to stop or prevent presentation of the entertainment content.

According to one exemplary embodiment, the above noted device includes at least one of (a) a watermark extractor configured to extract watermarks that are embedded in the entertainment content or in the one or more advertisements, and (b) a fingerprint computation component configured to compute a fingerprint associated with the entertainment content or in the one or more advertisements. Additionally, the device is further configured to identify the advertisement award program using one or more of the following: (A) watermarks extracted from the entertainment content by the watermark extractor, (B) watermarks extracted from the one or more advertisements by the watermark extractor, (C) fingerprints computed based on the entertainment content by the fingerprint computation component, and (D) fingerprints computed based on the one or more advertisements by the fingerprint computation component. In one exemplary embodiment, one or both of the watermark extractor and fingerprint computation component are implemented as a component separate from the processor. In another exemplary embodiment, one or both of the watermark extractor and fingerprint computation component are implemented as part of the processor.

According to yet another exemplary embodiment, the content policy information is associated with a specific aspect of the entertainment content, the specific aspect comprising one or more of: a rights holder of the entertainment content, a distribution channel of the entertainment content, a platform on which the entertainment content is presented, a genre of the entertainment content, a release window of the entertainment content, and a format of the entertainment content. In this exemplary embodiment, the processor is configured to allow presentation of the one or more advertisements in modified form for each entertainment content having the same specific aspect. In another exemplary embodiment, the above noted device is one of a: mobile device, a set-top box device, a handheld device, a personal computer, and a Blu-ray playback device.

Another aspect of the disclosed embodiments relates to a computer program product, embodied on a non-transitory computer readable medium, that includes program code for receiving an indication at a compliant device that an entertainment content is associated with a content policy information. where the content policy information relates to presentation of one or more advertisements during, or prior to, presentation of the entertainment content, and the content policy information is ascertained through one or both of (a) watermarks embedded in the one or more advertisements or the entertainment content, (b) computation of fingerprints associated with the one or more advertisements or the entertainment content. The computer program product further includes program code for receiving an indication that the entertainment content is associated with an advertisement award program, program code for providing an advertisement award program message indicating that modified presentation of the one or more advertisements is allowed in exchange for a specific number of award points of an advertisement award program, and program code for, upon receiving an indication that modified presentation of the one or more advertisements in exchange for the specific number of award points is desired, allowing the one or more advertisements to be presented in a modified form.

Another aspect of the disclosed embodiments relates to a method that includes receiving at least a portion of an entertainment content at a compliant device, and obtaining content policy information associated with the received entertainment content, where the content policy information relates to presentation of one or more advertisements during a specific release window of the entertainment content, and the content policy information is ascertained through one or both of: (a) extraction of watermarks that are embedded in the one or more advertisements or the entertainment content, and (b) computation and matching of fingerprints associated with the one or more advertisements or the entertainment content. Such an exemplary method further includes triggering presentation of the one or more advertisements: before allowing presentation of advertisement-free playback of the entertainment content, or simultaneous with presentation of the entertainment content.

In one exemplary embodiment, the release window includes a specific time period, upon the termination of which, the entertainment content is released in a different format. In one example embodiment, release of the entertainment content in the different format includes release of the entertainment content as a Blu-ray content, a broadcast television content, a cable television content, a video-on-demand content and a format playable by a mobile device.

According to another exemplary embodiment, the same one or more advertisements is presented before allowing or resuming presentation of the entertainment content on a plurality of playback devices. In one exemplary embodiment, each of the plurality of playback devices is categorized as at least one of: a mobile device, a set-top box device, a handheld device, a personal computer, and a Blu-ray playback device, and the content policy information provides for a different set of enforcement actions for each category of playback devices. In still another embodiment, the above noted method that takes into account the release window further includes, after allowing presentation of at least one advertisement, determining whether or not a sufficient number or duration of advertisements has been presented, and when an insufficient number or duration of advertisements has been presented, triggering presentation of at least one additional advertisement.

In yet another embodiment, existence of the specific release window is signaled through watermarks that are embedded in the entertainment content. In another example embodiment, expiration of the specific time window is signaled through watermarks that are embedded in the entertainment content that differ from watermarks that signal existence of the specific release window. In yet another exemplary embodiment, the one or more advertisements are selected to target a specific group of users and/or user devices based on a particular set of criteria. For example, the particular set of criteria includes one or more of: a title of the entertainment content, an advertisement presentation history of the compliant device, an advertisement presentation history of a user of the compliant device, a programming contextual relevance of the one or more advertisements, a current date and time, feedback of a user related to the one or more advertisements, a geographical location of the compliant device, a platform on which the compliant device is implemented, a type of the entertainment content, a storage format of the entertainment content, a distributor of the entertainment content, and a distribution channel of the entertainment content.

According to another embodiment, watermarks that are embedded in the entertainment content or in the one or more advertisements allow obtaining identification information associated with the entertainment content or with the one or more advertisements. In one exemplary embodiment, the identification information includes one or more of: a content identifier (CID), a source identifier (SourceID) and a timecode.

According to another example embodiment, the entertainment content does not include embedded watermarks, and the one or more advertisements include embedded watermarks. In this exemplary embodiment, triggering presentation of the one or more advertisements comprises determining a duration of watermarked advertisements from a plurality of timecodes embedded in the one or more presented advertisements, determining whether or not a sufficient duration or number of advertisements has been presented, and, upon a determination that a sufficient duration or number of advertisements has not been presented, triggering presentation of at least one additional advertisement.

In one exemplary embodiment, the entertainment content includes embedded watermarks and the one or more advertisements do not include embedded watermarks. In this exemplary embodiment, presenting the one or more advertisements comprises determining a duration of watermarked advertisements based on an absence of watermarks as the entertainment content is being presented, determining whether or not a sufficient duration or number of advertisements has been presented, and, upon a determination that a sufficient duration or number of advertisements has not been presented, triggering presentation of at least one additional advertisement.

In yet another exemplary embodiment, the entertainment content includes embedded watermarks, and the one or more advertisements include embedded watermarks. In this exemplary embodiment, presenting one or more advertisements includes identifying the entertainment content using the watermarks that are embedded in the entertainment content, identifying the one or more advertisements using the watermarks that are embedded in the one or more advertisements, determining whether or not the identified one or more advertisements are non-skippable with respect to the identified entertainment content, and, upon a determination that the identified one or more advertisements are non-skippable with respect to the identified entertainment content, triggering presentation of the one or more non-skippable advertisements.

Another aspect of the disclosed embodiments relates to a device that includes a receiver configured to receive one or both of (a) an entertainment content and (b) one or more advertisements. Such device also includes a processor that is configured to obtain content policy information associated with the received entertainment content, where the content policy information relates to presentation of one or more advertisements during a specific release window of the entertainment content, and the content policy information is ascertained through one or both of: (a) extraction of watermarks that are embedded in the one or more advertisements or the entertainment content, and (b) computation of fingerprints associated with the one or more advertisements or the entertainment content. The processor of such a device is further configured to trigger presentation of the one or more advertisements: before allowing presentation of advertisement-free playback of the entertainment content or simultaneous with presentation of the entertainment content.

In one exemplary embodiment, the processor is further configured to, after presentation of at least one advertisement, determine whether or not a sufficient number or duration of advertisements has been presented, and upon a determination that an insufficient number or duration of advertisements has been presented, trigger presentation of at least one additional advertisement. In another exemplary embodiment, the device further comprises a watermark extractor configured to extract one or more watermarks that are embedded in the entertainment content, and the processor is further configured to determine existence of the specific release window through the extracted watermarks. In yet another exemplary embodiment, the processor is further configured to determine expiration of the specific time window through at least one extracted watermark. In still another exemplary the watermark extractor is implemented as a component separate from the processor, while in another exemplary embodiment, the watermark extractor is implemented as part of the processor.

In another exemplary embodiment, the device further comprises a watermark extractor configured to extract one or more watermark that are embedded in the entertainment content or in the one or more advertisements, and the processor is further configured to obtain identification information associated with the entertainment content or with the one or more advertisements from the watermarks extracted by the watermark extractor.

In yet another exemplary embodiment, the entertainment content does not include embedded watermarks, the one or more advertisements include embedded watermarks. In this exemplary embodiment, the processor is configured to trigger presentation of the one or more advertisements by at least: determining a duration of watermarked advertisements from a plurality of timecodes embedded in the one or more presented advertisements, determining whether or not a sufficient duration or number of advertisements has been presented, and, upon a determination that a sufficient duration or number of advertisements has not been presented, triggering presentation of at least one additional advertisement must be presented.

In another exemplary embodiment, the entertainment content includes embedded watermarks and the one or more advertisements do not include embedded watermarks. In this exemplary embodiment, the processor is configured to trigger presentation of the one or more advertisements by at least: determining a duration of watermarked advertisements based on an absence of watermarks as the entertainment content is being presented, determining whether or not a sufficient duration or number of advertisements has been presented, and, upon a determination that a sufficient duration or number of advertisements has not been presented, triggering presentation of at least one additional advertisement must be presented.

In still another exemplary embodiment, the entertainment content includes embedded watermarks and the one or more advertisements include embedded watermarks. In this exemplary embodiment, the processor is configured to trigger presentation of the one or more advertisements by at least: identifying the entertainment content using the watermarks that are embedded in the entertainment content, identifying the one or more advertisements using the watermarks that are embedded in the one or more advertisements, determining whether or not the identified one or more advertisements are non-skippable with respect to the identified entertainment content, and upon a determination that the identified one or more advertisements are non-skippable with respect to the identified entertainment content, triggering presentation of the one or more non-skippable advertisements.

Another aspect of the disclosed embodiments relates to a computer program product, embodied on a non-transitory computer readable medium. The computer program product includes program code for receiving at least a portion of an entertainment content at a compliant device and program code for obtaining content policy information associated with the received entertainment content, where the content policy information relates to presentation of one or more advertisements during a specific release window of the entertainment content, and the content policy information is ascertained through one or both of: (a) extraction of watermarks that are embedded in the one or more advertisements or in the received entertainment content, and (b) computation of fingerprints associated with the one or more advertisements or the entertainment content. The computer program product further includes program code for triggering presentation of the one or more advertisements: before allowing presentation of advertisement-free playback of the entertainment content, or simultaneous with presentation of the entertainment content.

DETAILED DESCRIPTION OF CERTAIN EMBODIMENTS

Figure 1:
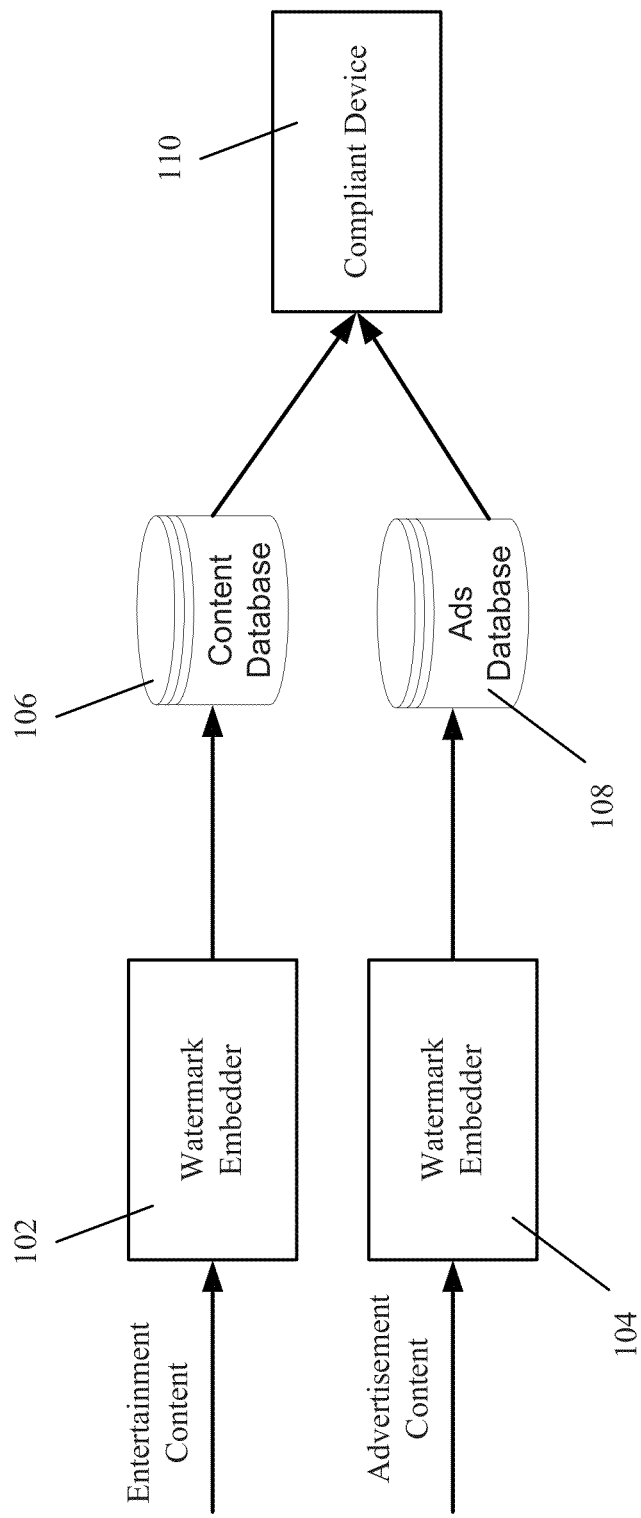
FIG. 1 shows a high-level diagram of an advertising-supported content distribution system in accordance with an exemplary embodiment.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Watermarking has been used to enable the communication and enactment of use policies for audiovisual content across a broad range of distribution channels and devices. Watermarks are typically embedded substantially imperceptibly in one or more components of a multimedia content, such as in an audio component or a video component, and can be used for a variety of applications such as tamper detection, copy management, content identification, broadcast monitoring, etc. Digital watermarks can also be used to communicate Content Policy Information (CPI) between the content provider and the compliant consumer devices. Examples of CPI include Copy Once, No More Copy, No Home Use (i.e. the content that contains such CPI information is intended for theatrical release only but not for home use), Trusted Source (implying that the content should be protected by approved encryption). As will be described in the sections that follow, watermarks can also be used to enable the advertisement-obliged or advertisement supported content distribution, where the presentation of certain advertisements is required for, or facilitates, the viewing of the entertainment content. For example, the disclosed embodiments can be used to effect award-earning content distribution, where the viewers can earn award points by viewing the presentation of such content including advertisements.

The watermarked content is distributed through any means and may ultimately be used on devices that incorporate the watermark detection functionality. The detection functionality enables those devices to retrieve the information contained within the watermarks and apply the associated content use policies. For example, the retrieved information may indicate that the content is only intended for theatrical release and not for use in any consumer devices, or the content is intended for use only under the governance of certain content protection technologies.

In some implementations, devices such as Blu-ray Disc players read CPI from the audio track of audiovisual content that they are playing or copying, and may limit the use of the content when certain unauthorized uses are identified. Playback or copying of unauthorized copies may be stopped or audio may be muted as enforcement response, depending on which CPI is found and what operation is being performed. For example, when the use of content is restricted based on a CPI, an explanatory message may be provided on the video screen or on the front panel of the device as part of the enforcement response.

Revenue from advertisement is one of the major sources for content providers to fully monetize their assets and investment. Modern user interfaces allow the users to smoothly switch channels to skip viewing the commercials. Devices such as Digital Video Recorders (DVRs) allow programs to be recorded for later viewing. During replay of such recorded programs, commercials can be skipped, either manually by the users or automatically by certain devices. Moreover, commercials can be removed or replaced from content for unauthorized distribution (e.g., broadcasting and online distribution). For content providers and distributors, it is crucial to prevent the user from conveniently skipping the advertisements especially in an advertisement-supported content distribution model.

In some embodiments of the present application, a non-skippable (or an enforced) advertisement system is provided such that playback of necessary advertisements is enforced as a specific content policy based on the CPI embedded as watermarks in advertisement-obliged content or in advertisement materials.

To utilize an advertisement-obliged state, a compliant consumer device (i.e., a consumer device that is configured to detect the CPI and enforce the associated polices) is needed to enforce a policy related to watching non-skippable advertisements during playback of the content that contains such a CPI. An example of such a policy associated with an ad-support CPI is to require certain advertisements or certain amount of advertisements to be watched without skipping or shortening the duration of content viewing (e.g., not to use fast-forward or other trick playback modes) during playback of content items distributed by a specific distributor or channel. It should be noted that while in describing certain embodiments of the present application references are made to "viewing" or "watching" advertisements, it is understood, that the disclosed embodiments are also applicable to audio content.

In addition to the CPI state, watermarks may also contain the information that identifies one or more of the following: One or more identifiers for the entertainment content title ("content ID" or CID); one or more identifiers for the content sources through which the content is distributed ("Content Source ID" or "SourceID"), such as TV networks, channels or content distributors; and/or one or more identifiers for individual segments of the content (for example a timecode, a counter value, and the like, that identifies temporal location of a content segment). For example, based on timecodes which identify each unique segment in a content item, the start and end of each watermarked segment of the content can also be identified. Thus, the duration of each watermarked segment can be calculated from the start and end positions of the segment in the content. CID, SourceID and timecodes are collectively called identification information. It should be noted that the above list of identification information is not exhaustive and the watermarks can carry additional information. Moreover, in some embodiments, one or more of the information carried on the watermark can be combined. It should also be noted that the identification information is not limited to being represented by the watermarks that are embedded in the content. Another representation of the identification information fingerprints, which are digests derived from features of the content without requiring modification of the content.

In the remainder of this disclosure, the term "content" is sometimes used to broadly cover audio and video contents, including, but not limited to, Movies, TV and Events, Music, Interactive Content, Mobile Content, UGC, Voice, Advertisements which are distributed by any means such as Terrestrial, cable, satellite, Internet Protocols, IPTV, OTT (Over-the-Top) Internet, Web, Mobile, Physical Media, and others. To avoid confusion, content that is dedicated for advertising is called an advertisement (sometimes abbreviated as "ad" or "ads") while the remaining types of content is referred to as "entertainment content." It is however understood that the content may have other purposes than entertainment. For example, news and documentaries are other non-exclusive types of content that may be referred to as "entertainment content" in this disclosure.

FIG. 1 shows a high-level diagram of an advertisement-obliged content distribution system in accordance with an exemplary embodiment. It should be noted that throughout this disclosure, the terms "advertisement obliged," "advertisement supported," and "advertisement enhanced" may be used interchangeably, in connection with content distribution, to refer to distribution of content that is accompanied by advertisements. These advertisements, among other things, may be required for viewing the content, may incentivize but not require a consumer to view the advertisements and/or allow financial transactions to occur that are associated with content and/or advertisements. As illustrated in FIG. 1, the entertainment content can be embedded with watermarks using the watermark embedder 102 and is stored at the content database 106. Similarly, the advertisement content can be embedded with watermarks using a watermark embedder 104 and stored at an ads database 108. The compliant device 110 can then access (or be presented with) the embedded content and/or advertisements. It should be noted that while two separate watermark embedders 102, 104 and two separate ads/content databases 106, 108 are shown (e.g., to show content and ads can be embedded and stored separately), in some embodiments, entertainment content and advertisement watermarking and/or storage may occur using the same watermark embedder (e.g., at the same facility) and/or the same database (or different portions of the same database) may be used to store the content and the advertisements.

The compliant device 110 of FIG. 1, can be any hardware, software (including system or application software), or combination of them that is capable of obtaining content policy information and taking actions in accordance with the policy. The actions may include granting award points in exchange for viewing the presentation of the award-earning content, controlling the presentation of the entertainment content and/or advertisements, and the like. Examples of the compliant device include Set-Top Boxes, Blu-ray players, tablets, mobile phones, PCs, TVs, media players, apps on mobile devices, etc.

Figure 2:
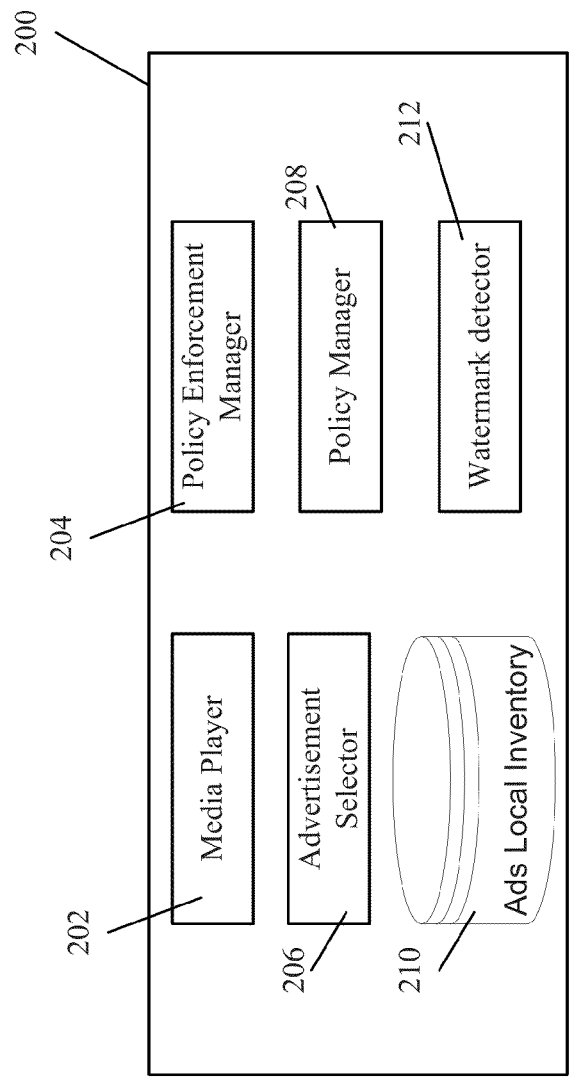
FIG. 2 illustrates some of the components within a compliant device in accordance with an exemplary embodiment.

FIG. 2 illustrates some of the components within a compliant device 200 in accordance with an exemplary embodiment. The exemplary compliant device 200 of FIG. 2 includes a media player 202 that plays the content including entertainment content and advertisements. The media player 200 can be equipped with various functionalities that allow, for example, playback of the content, in either or both forward and reverse directions, and at various speeds, allow skipping of the content, recording of the content and the like. The Advertisement Selector 206 is configured to select the advertisements from the Ads Local Inventory 210 based on, for example, personal preferences and other customization information. The Policy Enforcement Manager 204 is configured to execute the actions determined by Policy Manager 208. The Policy Manager 208 is configured to determine the actions based on the predefined policies associated with watermark payloads that are embedded in the content being played back. The Watermark Detector 212 is configured to detect watermarks from the content and recover the watermark payloads. The exemplary compliant device 200 of FIG. 2 can include fewer or additional items. For example, some of the components within FIG. 2 can be combined together and/or the compliant device 200 of FIG. 2 can include a processor, a memory, one or more communication units (which can include a receiver and/or a transmitter that is configured to receive and/or send data, information and signals to other entities through a communication channel), a display, speakers and other components to allow proper operations of the compliant device 200. For example, the compliant device 200 can include a content policy information detector that is configured to obtain the content policy information or state (e.g., the CPI that is specifically related to the advertisement-obliged content distribution) through one or more of: extraction of watermarks, computation of fingerprints and obtaining the CPI associated with a content from a remote device. Such a content policy information detector can, for example, be incorporated as part of the Policy Manager 208. In some embodiments, the content policy information may be obtained from a different component or device that resides outside of the compliant device (e.g., from a content distributor, advertisement servers, or other trusted entities in the home network or in the cloud).

In the sections that follow, three exemplary scenarios are described based on whether the advertisements, entertainment content or both are watermarked. If one of them is not watermarked or does not contain the watermark information that identifies the CID, Content Source ID and/or timecodes ("identification information"), such identification information may be made available to a compliant device (e.g., provided by the distribution system or through other identification system such as metadata lookup or digital fingerprinting content recognition).

Figure 3:
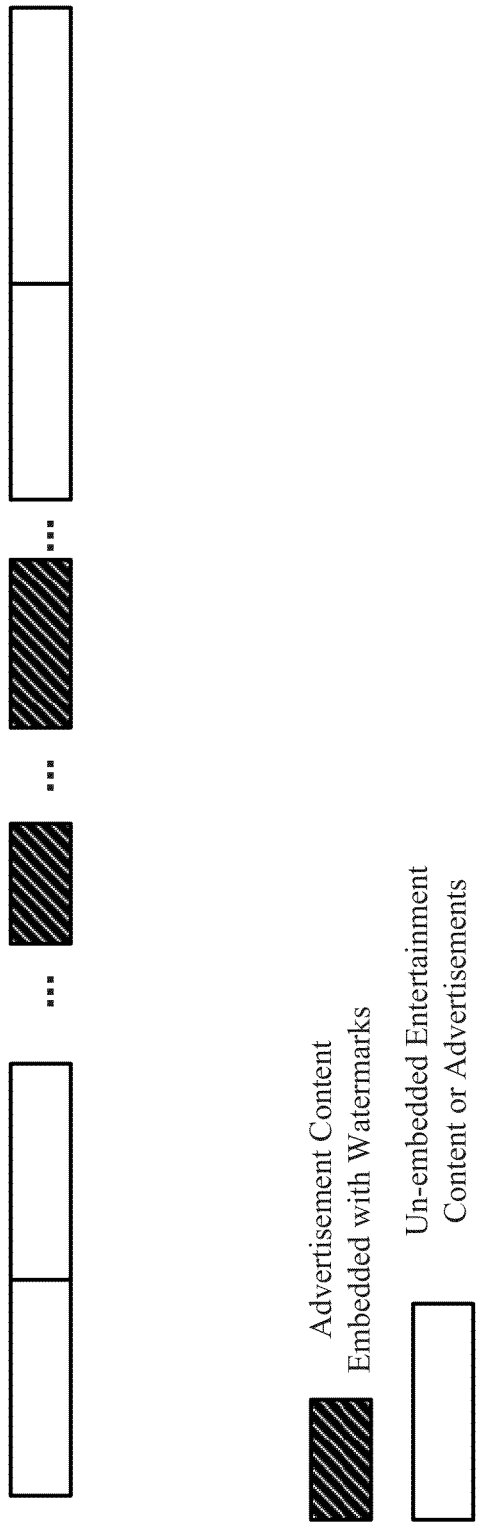
FIG. 3 shows a sequence of content segments in accordance with an exemplary embodiment in which one or more advertisements are watermarked.

FIG. 3 shows a sequence of content segments in accordance with an exemplary embodiment in which one or more advertisements are watermarked. In FIG. 3, the shaded regions represent advertisements that are interspersed within the entertainment content, and are embedded with watermarks. The clear regions represent unwatermarked entertainment content or advertisements. It should be noted that while in some embodiments, the embedded advertisements may be presented in a time-multiplexed fashion with respect to the remaining segments of the content, in other embodiments, the embedded advertisements (or advertisements in general) may be presented simultaneously as the entertainment content. In case of the latter, the advertisements may be presented as pop-ups, as translucent overlays, or on a separate display or as a separate window as the entertainment content. When the exemplary content segments of FIG. 3 are received at a compliant device, the compliant device can recover the identification information from the watermarked advertisements. The duration of watermarked advertisements can be calculated from, for example, the detected timecodes. The duration of the entertainment content being played back can be estimated from the duration of absence of watermarks, and/or provided by the system clock of the compliant device. An example of enforcement action in this scenario includes preventing skipping of the advertisement by mandatorily playing back the advertisements when insufficient advertisement time has been accumulated since the start of the playback.

Figure 4:
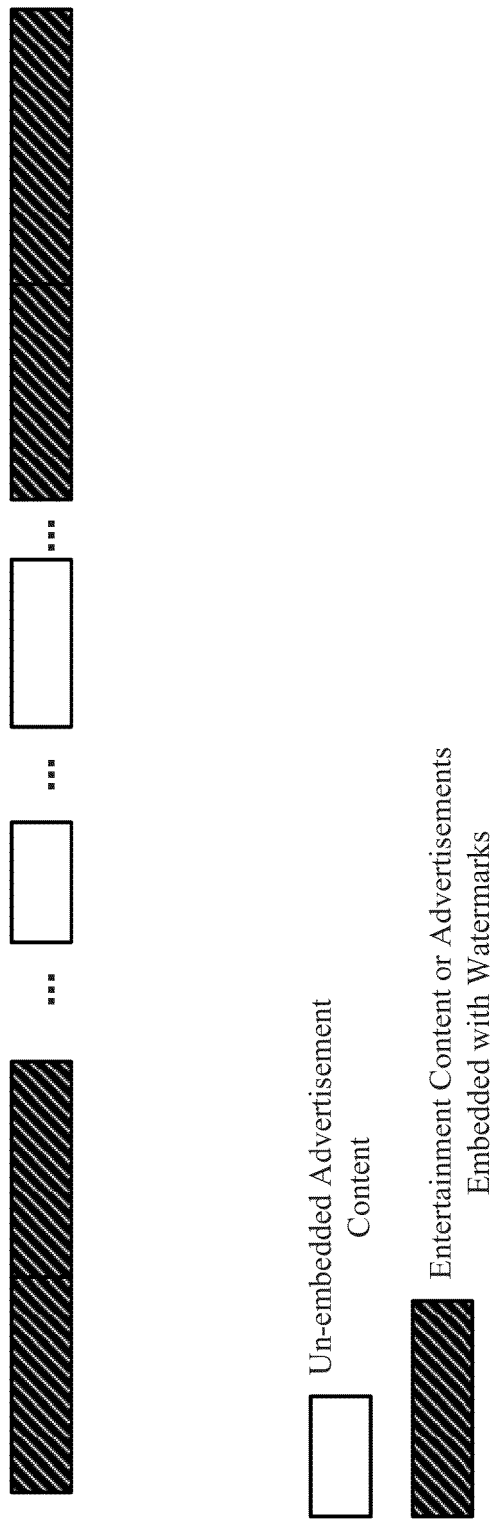
FIG. 4 shows a sequence of content segments in accordance with an exemplary embodiment, in which the entertainment content is watermarked.

FIG. 4 shows a sequence of content segments in accordance with an exemplary embodiment, in which the entertainment content is watermarked. In FIG. 4, the shaded regions represent embedded sections of the entertainment content, and the clear regions represent unwatermarked advertisements. When the exemplary content segments of FIG. 4 are received at a compliant device, the device can recover the identification information from the watermarked content. The duration of watermarked content can be calculated from, for example, the detected timecodes, and the duration of unwatermarked ads can be estimated from the duration of absence of watermarks or provided by compliant device when such ads are locally buffered. An example of enforcement action in this scenario includes preventing skipping of the advertisement by mandatorily playing back the advertisements when insufficient advertisement time has been accumulated since the start of the content playback.

Figure 5:
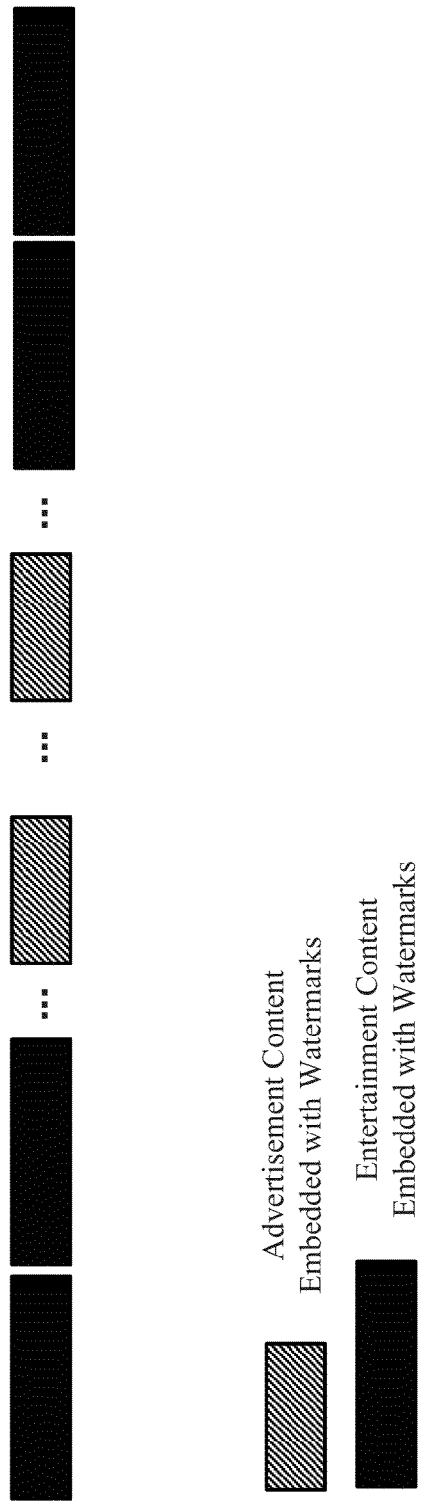
FIG. 5 shows a sequence of content segments in accordance with an exemplary embodiment in which the both the entertainment content and the advertisements are watermarked.

FIG. 5 shows a sequence of content segments in accordance with an exemplary embodiment, in which the both the entertainment content and the advertisements are watermarked. In FIG. 5, the solid black regions represent embedded sections of the entertainment content, and the shaded regions represent watermarked advertisements. The embedded information can include CID, SourceID, timecodes, and the like. When the exemplary content segments of FIG. 5 are received at a compliant device, the device can recover the identification information from the watermarked entertainment content and/or advertisements. The duration of both the watermarked content and watermarked advertisements can be calculated during the playback. A compliant device is able to identify the entertainment content and the advertisements based on the extracted CIDs from the watermarked entertainment content and watermarked advertisements, respectively. An example enforcement action in this scenario includes enforcing the playback a list of specific non-skippable ads during the playback of a list of specific entertainment contents. For example, a car company can show a new car advertisement whenever a specific movie is played back during an ad-supported release window on any home entertainment platform such as mobile device, computers or smart TVs.

It should be noted that throughout the present application, the term release window sometimes used to refer to a specific time period or time interval, upon the termination of which the entertainment content may be released in a different form. For example, an entertainment content is often released by the movie studios in phases, or windows. In particular, release windows of a movie can include, but are not limited to, theatrical release in select theaters, release in all (or a larger number of theatres), release on Blu-ray, DVD, release on release as video on demand, release on cable/satellite subscription networks, release on Internet, release on over-the-air television, and the like. In some of the disclosed embodiments, each release window may be signaled using embedded watermarks that, for example, differ from one release window to another. In some embodiments, the release window can be signaled from external sources, such as a database (e.g., iMDb) that includes information regarding the history and latest release window of an entertainment content.

According to the some embodiments, advertisements can be customized to allow targeted advertising. For example, different advertisements can be played with the same entertainment content depending on user's information (e.g., user's preferences) privately stored in the compliant device. As a result, the users are presented with more relevant and less annoying advertisement materials while advertisers benefit from consumer information without having actual access to the information.

Moreover, in some embodiments, such targeted advertisements can be dynamic. That is, the same user may be presented with different advertisements each time the same entertainment content is played back. Dynamic advertising may improve the user's experience (by avoiding repeated advertisements) and improve the value of the entertainment content (by introducing new advertisements).

In some exemplary embodiments, a compliant device may select an advertisement from the local advertisement inventory according to at least one or more of the following:

The title or genre of the entertainment content that is being played back;

The advertisement presentation history on a specific device;

The entertainment programming contextual relevance of an advertisement;

The current date and time;

The feedback provided by the user regarding the advertisements (collected from, for example, on an additional screen of a separate device, or a separate window on the same device that displays the entertainment content);

The location (e.g., geographic location) information of the device that presents the content, or user of such device;

The playback platform (e.g., whether the content is being presented on a laptop, game console, mobile phone, tablet, smart TV, etc.);

The type of the media that is used to distribute the content (e.g., physical disc, digital in HD, digital on mobile, etc.); and/or The content distributor and distribution channel (e.g., broadcast channel, OTT, VOD, etc.).

The advertisement can be delivered to the users through a variety of techniques, configurations and channels. In one example embodiment, the advertisements are part of the content or are bound together with the content. In these scenarios, the advertisements are, for example, inserted into the entertainment content prior to delivery for the application, such as video-on-demand (VOD). Such advertisements can be personalized by the VOD servers based on the information about devices, user profiles, the content that is being consumed, associated rights policies and the like. More details in this regard will be presented in the sections that follow.

In another exemplary embodiment, the advertisements are inserted during the delivery, for example, by the servers of Content Distribution Networks (CDN). In these scenarios, the advertisements can be regionally targeted. For example, local advertisements can be inserted for all customers in a particular local area.

In yet another exemplary embodiment, the advertisements are dynamically selected and inserted from a locally buffered advertisement inventory. Such insertion may be performed in real-time for broadcast or live content. Additionally, or alternatively, the insertion of such advertisements from a local inventory can be carried out for recorded content (e.g. using a DVR). Such advertisement inventory can be pulled by the compliant devices or pushed by the advertisement servers into the local advertisement storage during the same time as the content is being presented or distributed, or during previous presentation/distribution of the content. When advertisements are stored on local devices, they can be synchronized with Ads Servers periodically, manually, triggered by downloading/streaming of legitimate content, or triggered by extraction of watermark payloads. In one example embodiment, the reception of an entertainment content that includes one or more embedded watermarks can automatically trigger a watermark extractor to extract embedded watermarks. Based on the extracted watermarks, the compliant device can automatically select advertisements based on a particular criteria, and present the advertisements on the compliant device.

According to the disclosed embodiments, a variety of enforcement actions can be supported. Some examples of the actions are described below. However, it is understood that new actions may be defined, including actions that are provided by combining the actions from one or more existing categories.

In some embodiments, the enforcement action is based on advertising time requirements. For example, such an enforcement policy can require a minimum time for presentation of advertisements during the playback of an entertainment content. In one exemplary embodiment, the enforcement policy requires that at least one advertisement to be presented for every 5- or 10-minute presentation of an entertainment content. In another exemplary embodiment, the enforcement policy requires that a specific "pre-roll" advertisement precede the presentation of an entertainment content. In still another exemplary embodiment, the enforcement policy requires playback of N % advertisement (measured, for example, in terms of a percentage of time) for presentation of every (100-N) % entertainment content. In all of the above cases, a failure to fulfill the enforcement policy can result in an enforcement action, such as stoppage of playback of content, display of warning or informational messages, disabling of fast-forward functionality, and the like. In some embodiments, failure to fulfill the enforcement policy may result in more than one enforcement action, or can allow the user to select between alternate enforcement actions, some of which may not be detrimental to viewing of the content. In some embodiments, a compliant player may be configured to enforce one particular enforcement policy, such as disabling the fast-forward or skip functionalities, in accordance with enforcement policy requirements.

In some embodiments, the enforcement action is based on using an award program. For example, the enforcement policy can allow certain award/loyalty points to be spent in order to skip or shorten the presentation of advertisements during presentations of the entertainment content. For instance, these award points can be purchased or earned through loyalty programs provided by content providers, content distributors, networks, marketers, advertisement agencies or other parties. Details of using and earning Advertisement Credits are described in the sections that follow.

In some embodiments, enforcement action is based on cross-media and cross-platform advertising. In this context, a platform includes a hardware architecture and a software framework (such as one or more application frameworks), where software, particularly application software such as media player and media streaming client, to able to be executed. Typical platforms such as Microsoft Windows or Google Android include an architecture, operating system, programming languages and related user interface. Cross-media and cross-platform advertising can, for example, introduce more opportunities to create brand awareness by bringing the same advertising message across multiple media formats (e.g., in HD, SD and mobile), through different distribution methods (e.g., linear TV or VOD, Internet, 4G, etc.), and across different consumption platforms/devices (e.g., Set-Top Boxes, Blu-ray players, tablets, mobile phones, PCs, etc.). In some exemplary embodiments, the enforcement action associated with the cross-media/cross-platform advertising requires that a specific advertisement (or a specific group of advertisements) to be presented during presentation of a specific entertainment content item (or a specific group of entertainment contents). In some embodiments, advertisements may be grouped according to various criteria such as the brand name, sponsors, industry, category of the advertised products. Additionally, or alternatively, in some embodiments, entertainment content may be grouped according to 1) production and rights information such as the rights holder, content creator, and content distributor; 2) distribution information such as content distribution channels, distribution platforms, consumption platforms, and content sources; and/or 3) other content metadata such as ranking, genre, release window, format of the content, producer, crew that took part in content production, and the like.

Cross-media advertising policy can be implemented by matching the identification information between the advertisement and entertainment content by a compliant device. Such identification information may be extracted from watermarks or made available to the compliant devices or through other means such as metadata from content distributors or content recognition through digital fingerprinting.

Some examples of cross-media and cross-platform advertising, include but are not limited to:

A series of advertisements promoting a product are presented on all platforms, such as TVs, mobile devices, and PCs, during each live and recorded presentation of a series of episodes of a specific TV show from a specific network within a specific time period.

An advertisement promoting a car is presented whenever a specific movie is presented on all compliant devices such as Blu-ray players, tablets, mobile phones or PCs.

Presentation of a TV show requires presentation of advertisements from a TV network or its affiliates that create and distribute the TV show.

Presentation of a movie requires presentation of one or more advertisements from an advertiser who sponsors the distribution of the movie.

According to the disclosed embodiments, advertisement award points may be utilized in advertising-supported content distribution. Advertisement award programs may be created by a multiple system operator (MSO), a retailer, an advertiser or sponsor, advertisement agency, an OTT provider such as Netflix or Amazon, or a TV network, or a content owner. In some example embodiments, the award points accumulated through advertisement award program created by a content distributor may be redeemed only for the benefits associated with the content distributed by such distributor and its affiliates. To this end, one or more identifiers that are obtained by the compliant device are associated with one or more award programs. For example, the points earned from the award program created by ABC Networks may be redeemed for premium content viewing with a discounted fee, allowing viewing of an entertainment content without (or with shortened) advertisements, or receiving discounts to purchase products at a Disney store. In some example embodiments, the user can spend the award points to skip or shorten the advertisements during the playback of the entertainment content that contains the CPI 'ads-support' state. For example, the award points are redeemed from the user's account associated with the award program that is created by the distributor of such entertainment content, and registered with the identification information of such entertainment content which is obtained by the compliant device. According to some embodiments, the user can redeem the accumulated advertisement award points to receive product discounts, gifts, or cash from advertisers.

The disclosed embodiments further allow advertisement award points to be earned and redeemed in different ways. For example, the points can be purchased, earned via purchase of a content (e.g., via download, VOD, DBD/BD, etc.), earned by viewing certain affiliates programs, or other promotions. Alternatively, or additionally, award points can be earned by viewing advertisements across multiple platforms such advertisements presented on a TV, on an online program, and/or on mobile device. Such award points may be calculated based on the number of advertising impressions exposed to a user or duration of the watched advertisements. Such watched advertisements can be identified and measured automatically by the compliant device that continuously identifies the entertainment content and advertisements during the their presentation. The award points can be stored locally at the compliant devices and/or submitted by the compliant device to a central location that keeps track of the award points. In additional or alternate embodiments, credits can be purchased, transferred, and further shared among family members.

In some embodiments, a user may create multiple accounts with different advertisement award programs. Each advertisement award program can, for example, correspond to one or more CIDs that are extracted from the entertainment content or advertisements. An advertisement award program can be established by an advertiser, advertisement sponsor, agency, promoter, content distributor or producer, and market intelligence firms to promote and sell the products or enrich the value of the ads. When an advertisement identified by a particular CID is presented to a user, the user (or the compliant device associated with that user) earns award points from one or more of the associated award programs that are registered with such identifier. When a particular CID is associated with more than one award program, the user or the compliant device may determine the preference of these programs so that the award points earned by watching the identified advertisements are only credited to the preferred award program. The award points can be redeemed against the offers provided by the owner of the award program. For example, the award points from an advertiser can be redeemed for coupons to buy the products or services provided by such advertiser. In another example, the award points from a content distributor may be redeemed for reduced advertisements on the program provided by such distributor or for personalized and exclusive content.

In additional or alternate embodiments, award points earned in different programs may be transferred, exchanged, and further shared among these programs subject to the collaboration and agreements among these programs.

Figure 6A:
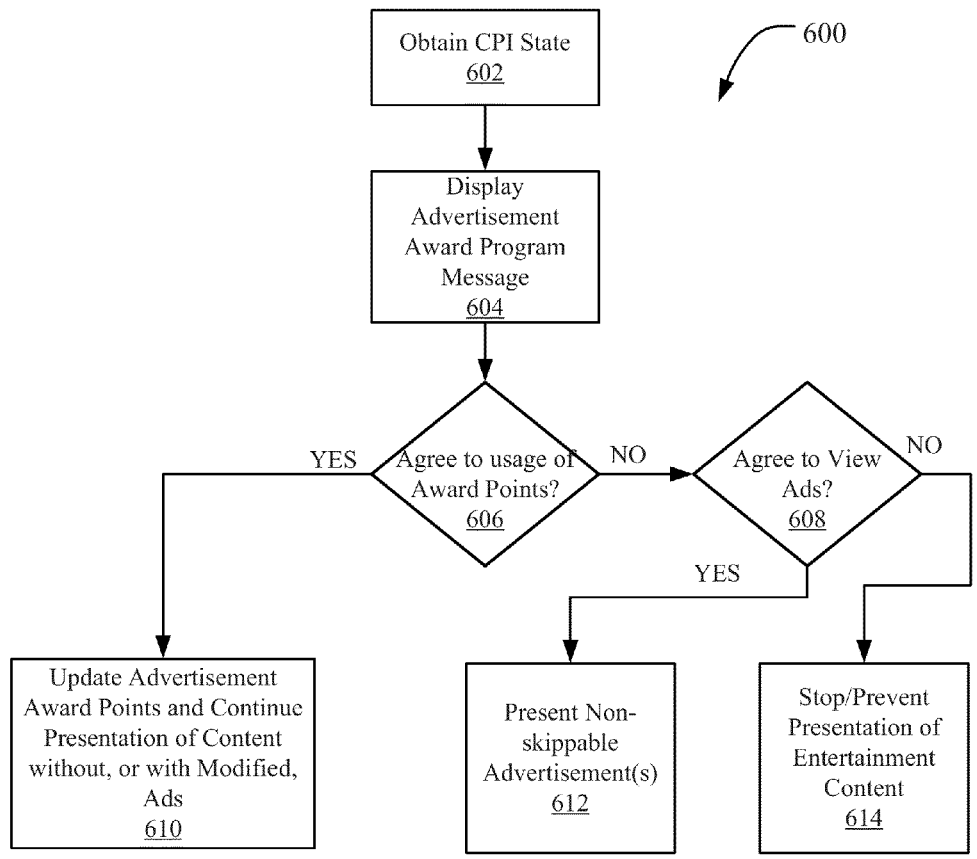
FIG. 6A illustrates a set of operations that can be carried out when content distribution using a CPI state (e.g., 'ads-obliged state) is effected in a accordance with an exemplary embodiment.

FIG. 6A illustrates the operations 600 that can be carried out when content distribution using a CPI state (e.g., 'ads-obliged state) is effected in a accordance with an exemplary embodiment. In particular, the operations 600 start at 602 when the CPI state (e.g., 'ads-obliged' state) is obtained. Next, at 604 an advertisement award program message is displayed to the user. For example, the message at 604 can indicate to the user that "N advertisement award points are required to continue playback" of the entertainment content. Upon seeing the message, the user can make a decision as to whether or not agree to use his/her accumulated award points. If received input at 606 is affirmative (i.e., "YES" at 606), at 610, the advertisement award points are updated (e.g., reduced to account for subtraction of N credits), and the playback of the entertainment content continues without advertisements or with a modified (e.g., an abbreviated) version of advertisements. If, on the other hand, received input at 606 is a "NO" (e.g., the user does not agree to use N award points), then the user may be optionally be prompted at 608 to answer whether or not he/she agrees to watch the advertisements. If the answer received at 608 is a "NO," then presentation of content is stopped at 614 (or is prevented, if the operations 600 are carried out, for example, prior to presentation of the entertainment content). If the input received at 608 is affirmative (i.e., "YES" at 608), then at 612 one or more non-skippable advertisements are presented to the user. In some embodiments, the user may have the option of selecting the particular advertisement(s) for viewing, while in other embodiments, the advertisements may be selected for the user. Such a selection may be carried out based on the user profile (e.g., stored user preferences), at random, or based on other criteria, such as the type of platform, the content format, the content owner's preferences and the like. It should be noted that the various messages that are presented to the user in the exemplary operations 600 of FIG. 6A, may be displayed as interruptions in presentation of the entertainment content, as an overlay (a pop-up, a translucent overlay, or as a picture-in-picture screen), or on a companion device (e.g., on a tablet device, when the entertainment program is being presented on a television). It should be further noted that, in some embodiments, operations at 608 and 614 may not be implemented. That is, at 606, upon user's refusal to use the his/her award points, the operations 600 directly flows to 612, where non-skippable advertisement(s) are presented to the user.

Figure 6B:
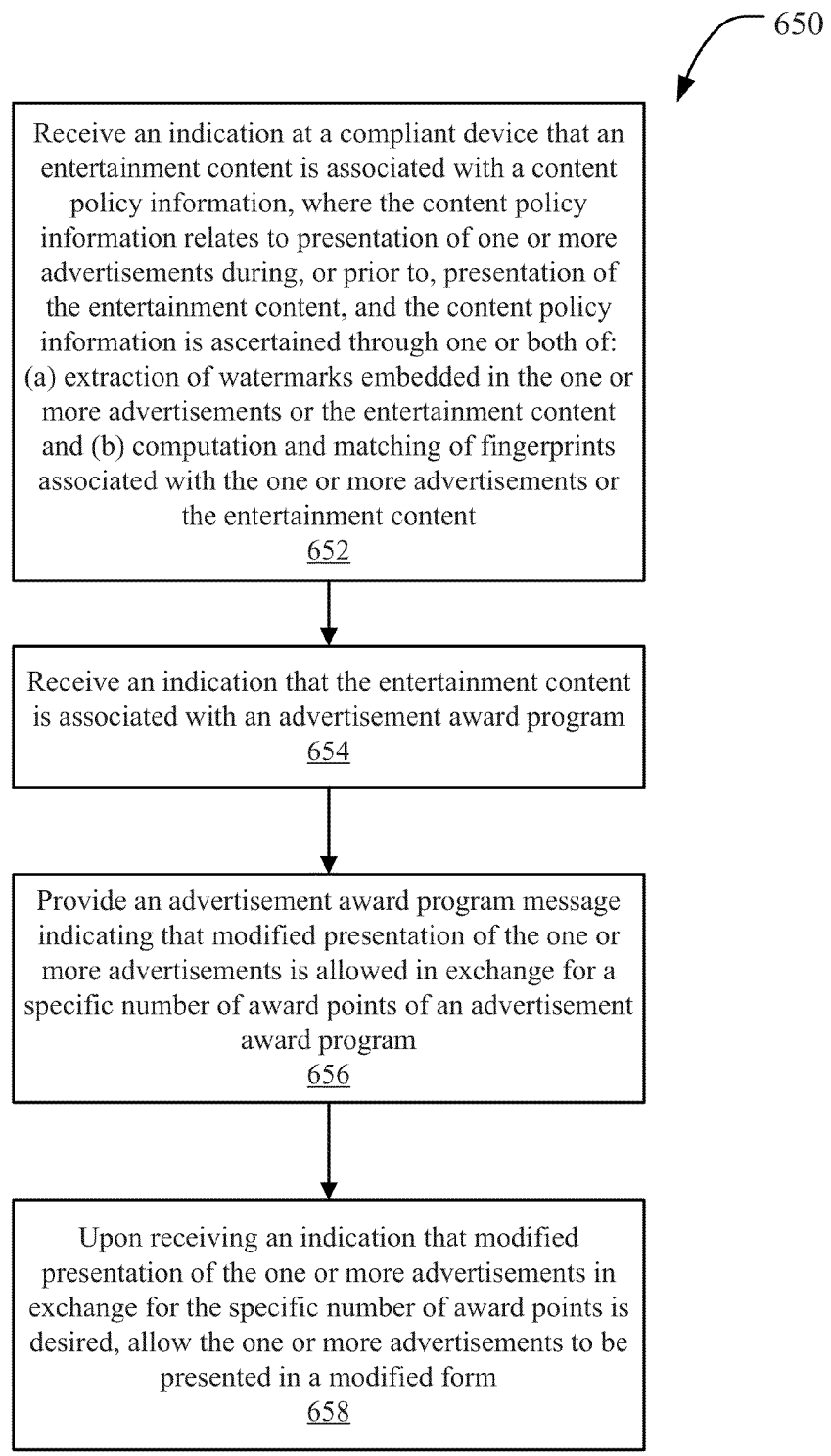
FIG. 6B illustrates a set of operations 650 that can be carried out to control presentation of an entertainment content and associated advertisements in accordance with an exemplary embodiment.

FIG. 6B illustrates a set of operations 650 that can be carried out to control presentation of an entertainment content and associated advertisements in accordance with an exemplary embodiment. At 652, an indication at a compliant device is receive that an entertainment content is associated with a content policy information. The content policy information relates to presentation of one or more advertisements during, or prior to, presentation of the entertainment content. Further, the content policy information is ascertained through one or both of: (a) extraction of watermarks embedded in the one or more advertisements or the entertainment content and (b) computation and matching of fingerprints associated with the one or more advertisements or the entertainment content. At 654, an indication that the entertainment content is associated with an advertisement award program is received. At 656, an advertisement award program message is provided that indicates modified presentation of the one or more advertisements is allowed in exchange for a specific number of award points of an advertisement award program. At 658, upon receiving an indication that modified presentation of the one or more advertisements in exchange for the specific number of award points is desired, one or more advertisements are allowed to be presented in a modified form.

Figure 7:
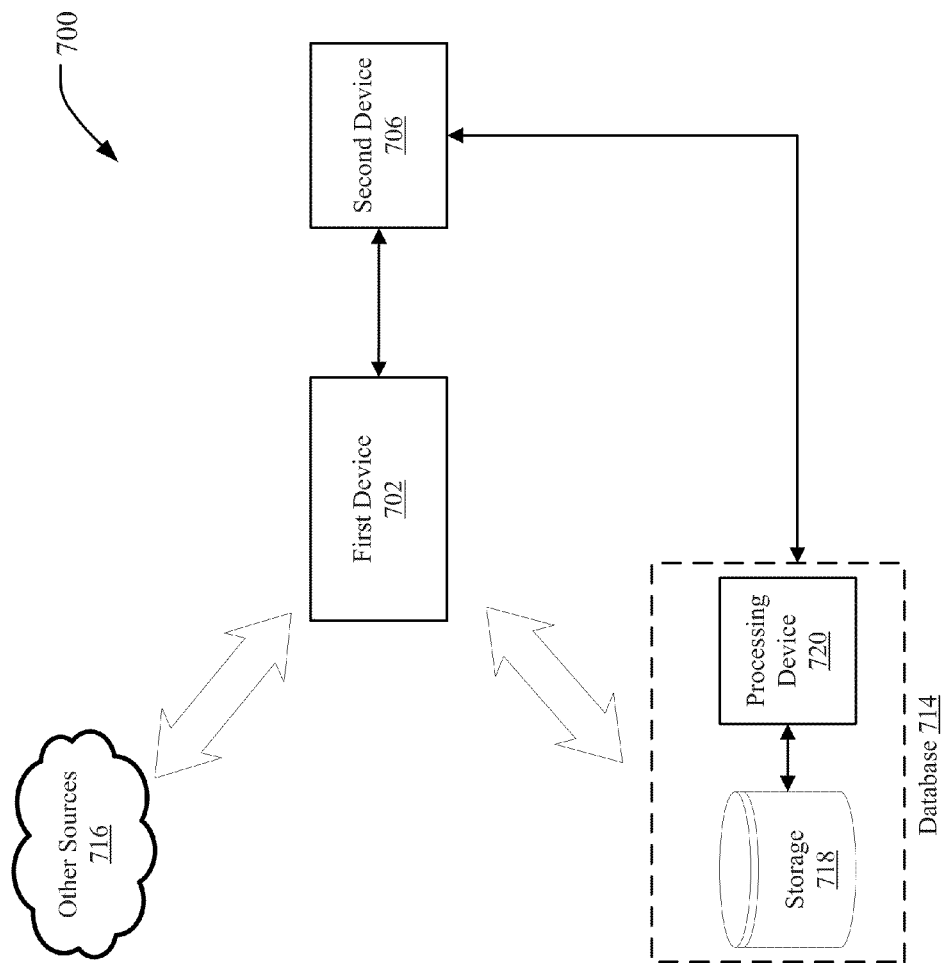
FIG. 7 illustrates a system 700 that can accommodate the disclosed embodiments.

FIG. 7 illustrates a system 700 that can accommodate the disclosed embodiments. The system 700 includes a first device 702 that is configured to present a multimedia content that can include both the entertainment content and the advertisements. The first device 702 can be coupled to, or include, a display screen, a projector screen, one or more speakers and the associated circuitry, such as a processor and a memory, as well as software components to enable the reception, storage, processing and presentation of a multimedia content. The first device 702 can be in communication with a database 714. The database 714 includes one or more storage 718 devices for storage of a variety of multimedia content, including the entertainment content and the advertisements, as well as meta data, survey results, applications, instructions, etc., which may be stored on magnetic, optical, semiconductor and/or other types of memory devices. The database 714 can, for example, include a remote (e.g., cloud-based) storage device.

The first device 702 may, alternatively or additionally, be configured to receive multimedia content and metadata through one or more other sources 716, such as through the Internet, through a terrestrial broadcast channel, through a cable network, through a home network (e.g., a Digital Living Network Alliance (DLNA) compliant network), through a wired or wireless network (e.g., a local area network (LAN), wireless LAN (WLAN), a wide area network (WAN) and the like). Such a media content can also be a real-time (e.g., streaming) content that is broadcast, unicast or otherwise provided to the first device 702. The received content can be at least partially stored and/or buffered before being presented by the first device 702. In some embodiments, the first device 702 is a compliant device that is shown in FIG. 2.

Referring again to FIG. 7, in some embodiments, the first device 702 is also in communication with at least a second device 706 to, for example, present various questions or alerts to the user. In some embodiments, the second device 706 is also in communication with the database 714. Connectivity between the various devices in FIG. 7, and components therein, can be effectuated using any one of wired or wireless communication techniques, including but not limited to 802.11 protocol, Bluetooth, Infrared transmissions, and the like.

Figure 8:
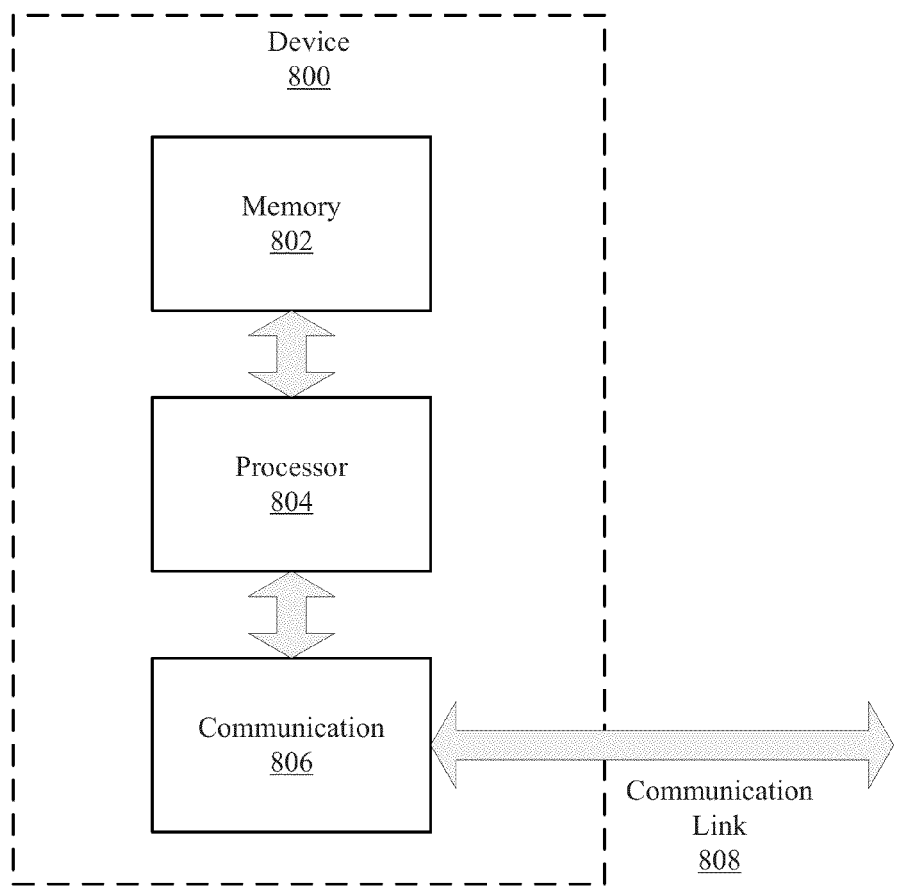
FIG. 8 illustrates a simplified diagram of an exemplary device within which various disclosed embodiments may be implemented.

Certain aspects of the disclosed embodiments can be implemented as a device that includes a processor, and a memory comprising processor executable code, the processor executable code, when executed by the processor, configures the device to perform any one of and/or all operations that are described in the present application. In some examples, the devices that are described in the present application can comprise a processor, a memory unit, an interface that are communicatively connected to each other, and may range from desktop and/or laptop computers, to consumer electronic devices such as media players, mobile devices and the like. For example, FIG. 8 illustrates a block diagram of a device 800 within which various disclosed embodiments may be implemented. The device 800 comprises at least one processor 804 and/or controller, at least one memory 802 unit that is in communication with the processor 804, and at least one communication unit 806 that enables the exchange of data and information, directly or indirectly, through the communication link 808 with other entities, devices, databases and networks. The communication unit 806 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. The exemplary device 800 of FIG. 8 may be integrated as part of a compliant device, such as the compliant device that is shown in FIG. 2, to carry out some or all of the operations that are described in the present application.

Figure 9:
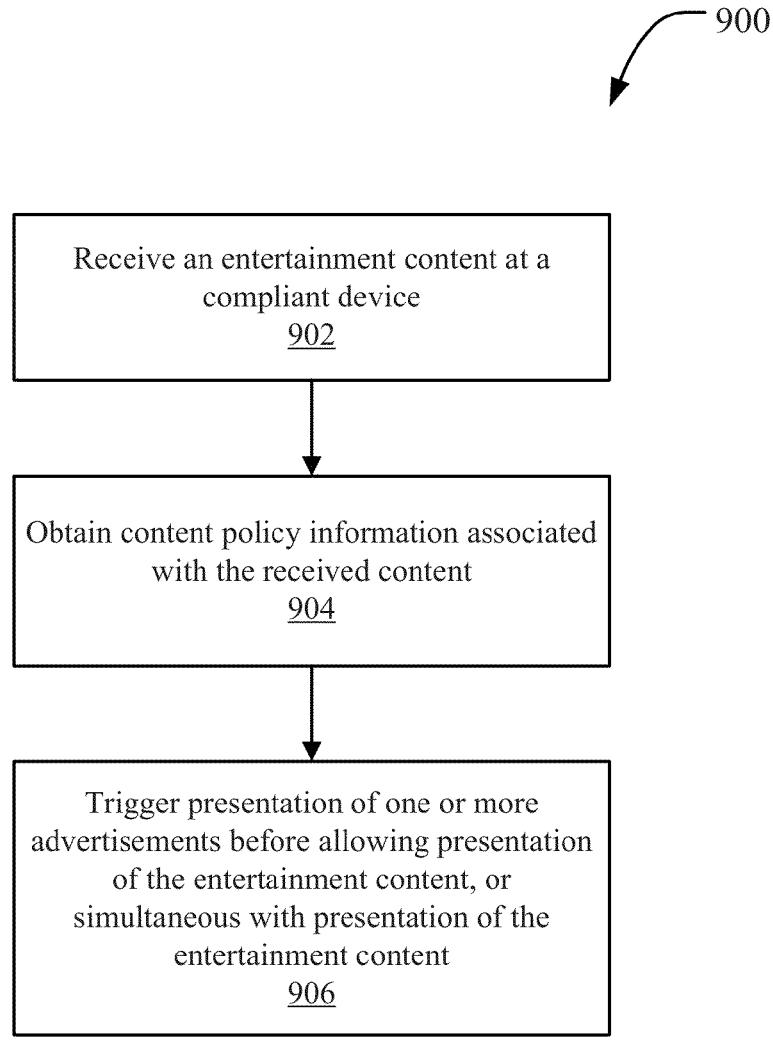
FIG. 9 illustrates a set of operations that can be carried out to effectuate advertising-supported content distribution in accordance with an exemplary embodiment.

In some embodiments, the device 800 of FIG. 8 may also be incorporated into a device that resides at a remote database, such as database 714, that is shown in FIG. 7, and is configured to perform some or all of the operations that are described in accordance with various disclosed embodiments. FIG. 9 illustrates a set of operations 900 that can be carried out to effectuate advertising-supported content distribution in accordance with an exemplary embodiment. At 902, an entertainment content is received at a compliant device. At 904, content policy information associated with the received content is obtained. Such a content policy information relates to presentation of one or more advertisements during a specific release window of the entertainment content, and is ascertained through one or both of: (a) extraction of watermarks that are embedded in the one or more advertisements or the received entertainment content, and (b) computation of fingerprints associated with the one or more advertisements or the entertainment content. At 906, presentation of one or more advertisements is triggered before allowing presentation of the entertainment content or simultaneous with presentation of the entertainment content. The presentation of the one or more advertisements can be done on the compliant device that is presenting the entertainment content, or on another device companion to the compliant device.

Figure 10:
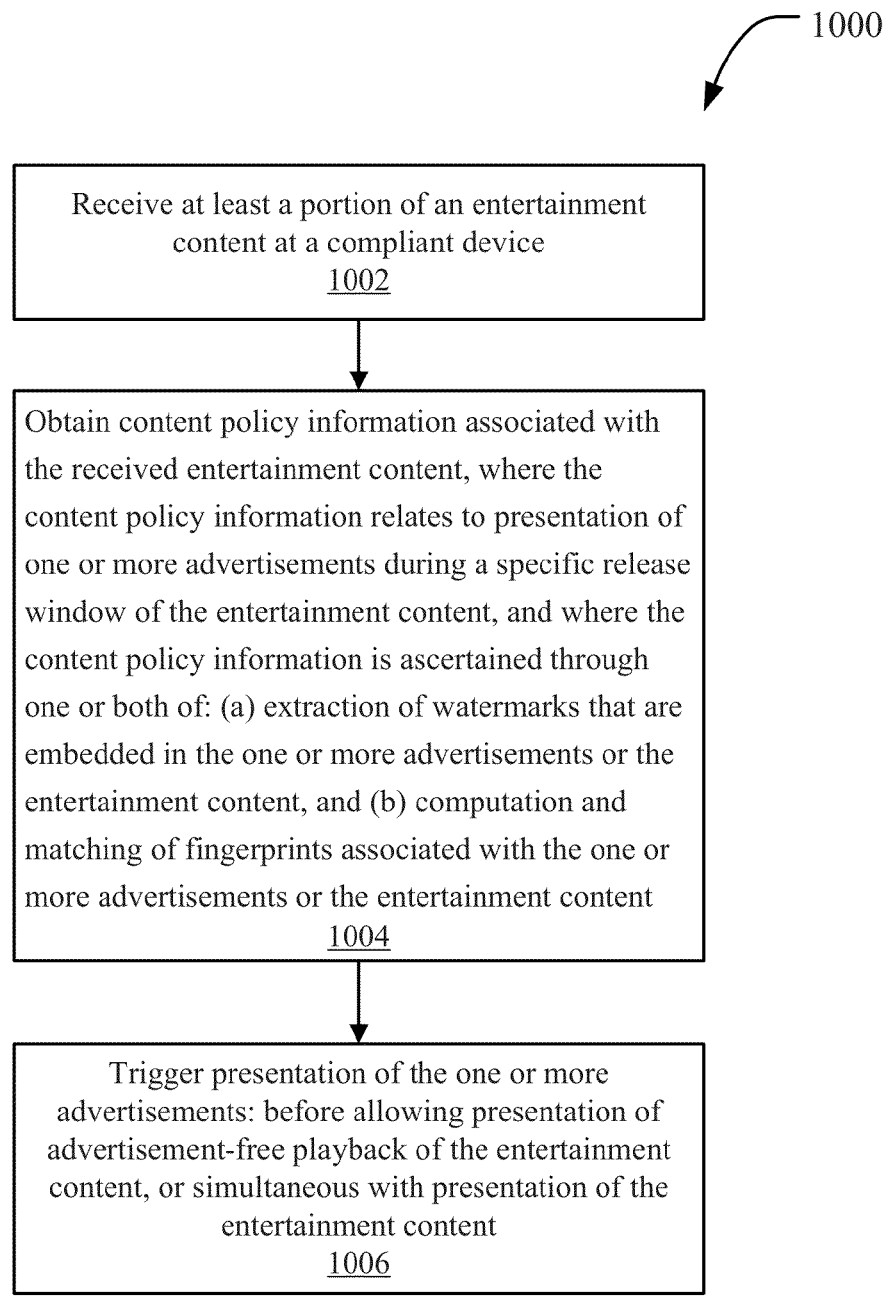
FIG. 10 illustrates a set of operations that may be carried out to trigger presentation of one or more advertisements in accordance with an exemplary embodiment.

FIG. 10 illustrates a set of operations 1000 that may be carried out to trigger presentation of one or more advertisements in accordance with an exemplary embodiment. In particular, at 1002, at least a portion of an entertainment content is received at a compliant device. At 1004, content policy information associated with the received entertainment content id obtained. The content policy information relates to presentation of one or more advertisements during a specific release window of the entertainment content, and the content policy information is ascertained through one or both of: (a) extraction of watermarks that are embedded in the one or more advertisements or the entertainment content, and (b) computation and matching of fingerprints associated with the one or more advertisements or the entertainment content. At 1006, presentation of the one or more advertisements is triggered. Such presentation is provided before allowing presentation of advertisement-free playback of the entertainment content, or simultaneous with presentation of the entertainment content.

As noted earlier, the disclosed embodiments further allow delivery of targeted advertisements that are consistent and/or synchronized across multiple media, distribution methods and consumption platforms. Further, an award program in accordance with the presented embodiments allows the users to earn points by, for example, watching advertisements, and spending/applying the earned points to skip or shorten presentation of future advertisements. As such, the disclosed embodiments at the very least address the problems of advertisement skipping, inconsistent targeted advertisements across different media types and platforms, and lack of motivation/loyalty with respect to advertisement consumption.

It is understood that the various embodiments of the present disclosure may be implemented individually, or collectively, in devices comprised of various hardware and/or software modules, units and components. In describing the disclosed embodiments, sometimes separate components have been illustrated as being configured to carry out one or more operations. It is understood, however, that two or more of such components can be combined together and/or each component may comprise sub-components that are not depicted. Further, the operations that are described in the present application are presented in a particular sequential order in order to facilitate understanding of the underlying concepts. It is understood, however, that such operations may be conducted in a different sequential order, and further, additional or fewer steps may be used to carry out the various disclosed operations.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

A content that is embedded with watermarks in accordance with the disclosed embodiments may be stored on a storage medium or transmitted through a communication channel. In some embodiments, such a content that includes one or more imperceptibly embedded watermarks, when accessed by a content handling device (e.g., a software or hardware media player) that is equipped with a watermark extractor and/or a fingerprint computation component, can trigger a watermark extraction or fingerprint computation process to trigger the various operations that are described in this application.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
receiving an indication at a compliant device that an entertainment content is associated with a content policy information, the content policy information relating to presentation of one or more advertisements during, or prior to, presentation of the entertainment content, the content policy information obtained using a content identifier (CID) that is ascertained through one or both of: (a) extraction of watermarks embedded in the one or more advertisements or the entertainment content or (b) computation and matching of fingerprints associated with the one or more advertisements or the entertainment content;
receiving an indication that the CID associated with the entertainment content or the one or more advertisements is associated with a plurality of advertisement award programs for a particular user of the complaint device;
providing an advertisement award program message indicating that modified presentation of the one or more advertisements is allowed in exchange for a specific number of award points of an advertisement award program;
upon receiving an indication that modified presentation of the one or more advertisements in exchange for the specific number of award points is desired, allowing the one or more advertisements to be presented in a modified form, and
upon receiving an indication that modified presentation of the one or more advertisements in exchange for the specific number of award points is not desired: (a) presenting the one or more advertisements without modification, wherein at least one of the one or more advertisements is associated with the CID that corresponds to more than one of the plurality of advertisement award programs for the particular user of the compliant device, (b) determining by the compliant device which of the plurality of the one or more advertisement award programs constitutes a preferred award program, and (c) crediting the preferred award program with award points associated with the at least one of the one or more advertisements that were presented in unmodified form.

2. The method of claim 1, wherein the content policy information is indicative that presentation of the one or more advertisements cannot be modified without receiving further input from a user or from a user device.

3. The method of claim 1, wherein the advertisement award program is associated with one of: the user, or the compliant device.

4. The method of claim 1, further comprising accumulating further award points in return for one or more of the following:
presentation of one or more un-modified advertisements, purchase of one or more specific entertainment contents, or purchase of at least some of the specific number of award points.

5. The method of claim 1, further comprising accumulating further award points in return for presentation of one or more unmodified advertisements on each of a plurality of devices associated with a user.

6. The method of claim 1, wherein modified presentation of the one or more advertisements includes one or more of: shortened presentation of the one or more advertisements or skipping of the one or more advertisements.

7. The method of claim 1, further comprising:
upon receiving an indication that modified presentation of the one or more advertisements in exchange for the specific number of award points is not desired, presenting a message indicating that presentation of the entertainment content is allowed upon an agreement to view the one or more advertisement in unmodified format; and
upon receiving an indication as to an agreement to view the one or more advertisements in unmodified format, presenting the one or more advertisements without modification.

8. The method of claim 1, further comprising:
upon receiving an indication that modified presentation of the one or more advertisements in exchange for the specific number of award points is not desired, presenting a message indicating that presentation of the entertainment content is allowed upon an agreement to view the one or more advertisement in unmodified format; and
upon receiving an indication as a lack of an agreement to view the one or more advertisements in unmodified format, providing a command to stop or prevent presentation of the entertainment content.

9. The method of claim 1, wherein each advertisement award program is owned by a particular entity, and award points of each advertisement award program are redeemable through other entities affiliated with the particular entity.

10. The method of claim 9, wherein the particular entity is one of: an advertiser, a television network, an entertainment content owner, or a content distributor.

11. The method of claim 1, wherein the advertisement award program is identified at least in-part by identifying the entertainment content using one or more of the following:
(A) watermarks that are embedded in the entertainment content,
(B) watermarks that are embedded in the one or more advertisements,
(C) fingerprints that are computed based on the entertainment content, or
(D) fingerprints that are computed based on the one or more advertisements.

12. The method of claim 1, wherein:
the content policy information is associated with a specific aspect of the entertainment content, the specific aspect comprising one or more of:
a rights holder of the entertainment content,
a distribution channel of the entertainment content,
a platform on which the entertainment content is presented,
a genre of the entertainment content,
a release window of the entertainment content, or
a format of the entertainment content; and the one or more advertisements in modified form are presented before allowing or resuming presentation of each entertainment content having the same specific aspect.

13. The method of claim 12, wherein the rights holder of the entertainment content includes one of a creator or a distributor of the entertainment content.

14. The method of claim 12, wherein the distribution channel includes one of over-the-top (OTT), over-the-air, video on demand (VOD), satellite, cable, wireless or Internet distribution channels.

15. The method of claim 12, wherein the platform includes one of a mobile, desktop, or television platforms.

16. A device, comprising:
a receiver configured to receive one or both of (a) an entertainment content and (b) one or more advertisements; and
a processor configured:
to receive an indication that an entertainment content is associated with a content policy information, the content policy information relating to presentation of one or more advertisements during, or prior to, presentation of the entertainment content, the content policy information obtained using a content identifier (CID) that is ascertained through one or both of (A) watermarks embedded in the one or more advertisements or the entertainment content, or (B) computation of fingerprints associated with the one or more advertisements or the entertainment content;
to receive an indication that the CID associated with the entertainment content or the one or more advertisements is associated with a plurality of advertisement award programs for a particular user,
to provide an advertisement award program message indicating that modified presentation of the one or more advertisements is allowed in exchange for a specific number of award points of an advertisement award program,
upon receiving an indication that modified presentation of the one or more advertisements in exchange for the specific number of award points is desired, to allow the one or more advertisements to be presented in a modified form, and
upon receiving an indication that modified presentation of the one or more advertisements in exchange for the specific number of award points is not desired: (a) present the one or more advertisements without modification, wherein at least one of the one or more advertisements is associated with the CID that corresponds to more than one of the plurality of advertisement award programs for the particular user, (b) determine by the compliant device which of the plurality of the one or more advertisement award programs constitutes a preferred award program, and (c) credit the preferred award program with award points associated with the at least one of the one or more advertisements that were presented in unmodified form.

17. The device of claim 16, wherein the content policy information is indicative that presentation of the one or more advertisements cannot be modified without receiving further input.

18. The device of claim 16, wherein the advertisement award program is associated with one of: the user, or the device.

19. The device of claim 16, wherein the processor is further configured to accumulate further award points in return for one or more of the following:
presentation of one or more un-modified advertisements,
purchase of one or more specific entertainment contents, or
purchase of at least some of the specific number of award points.

20. The device of claim 16, wherein modified presentation of the one or more advertisements includes one or more of: shortened presentation of the one or more advertisements or skipping of the one or more advertisements.

21. The device of claim 16, wherein the processor is further configured to:
upon receiving an indication that modified presentation of the one or more advertisements in exchange for the specific number of award points is not desired, present a message indicating that presentation of the entertainment content is allowed upon an agreement to view the one or more advertisement in unmodified format; and
upon receiving an indication as to an agreement to view the one or more advertisements in unmodified format, present the one or more advertisements without modification.

22. The device of claim 16, wherein the processor is further configured to:
upon receiving an indication that modified presentation of the one or more advertisements in exchange for the specific number of award points is not desired, present a message indicating that presentation of the entertainment content is allowed upon an agreement to view the one or more advertisement in unmodified format; and
upon receiving an indication as to a lack of an agreement to view the one or more advertisements in unmodified format, provide a command to stop or prevent presentation of the entertainment content.

23. The device of claim 16, wherein each advertisement award program is owned by a particular entity, and wherein the particular entity is one of: an advertiser, a television network, an entertainment content owner, or a content distributor.

24. The device of claim 16, wherein
the device includes at least one of:
(a) a watermark extractor configured to extract watermarks that are embedded in the entertainment content or in the one or more advertisements, or
(b) a fingerprint computation component configured to compute a fingerprint associated with the entertainment content or in the one or more advertisements; and
the device is further configured to identify the advertisement award program using one or more of the following:
(A) watermarks extracted from the entertainment content by the watermark extractor,
(B) watermarks extracted from the one or more advertisements by the watermark extractor,
(C) fingerprints computed based on the entertainment content by the fingerprint computation component, or
(D) fingerprints computed based on the one or more advertisements by the fingerprint computation component.

25. The device of claim 24, wherein one or both of the watermark extractor and fingerprint computation component are implemented as a component separate from the processor.

26. The device of claim 24, wherein one or both of the watermark extractor and fingerprint computation component are implemented as part of the processor.

27. The device of claim 16, wherein:
the content policy information is associated with a specific aspect of the entertainment content, the specific aspect comprising one or more of:
a rights holder of the entertainment content,
a distribution channel of the entertainment content,
a platform on which the entertainment content is presented,
a genre of the entertainment content,
a release window of the entertainment content, or
a format of the entertainment content; and
the processor is configured to allow presentation of the one or more advertisements in modified form for each entertainment content having the same specific aspect.

28. The device of claim 27, wherein the rights holder of the entertainment content includes one of a creator or a distributor of the entertainment content.

29. The device of claim 27, wherein the distribution channel includes one of over-the-top (OTT), over-the-air, video on demand (VOD), satellite, cable, wireless or Internet distribution channels.

30. The device of claim 27, wherein the platform includes one of a mobile, desktop, or television platforms.

31. The device of claim 16, wherein the device is one of a: mobile device, a set-top box device, a handheld device, a personal computer, or a Blu-ray playback device.

32. A computer program product, embodied on a non-transitory computer readable medium, comprising:
program code for receiving an indication at a compliant device that an entertainment content is associated with a content policy information, the content policy information relating to presentation of one or more advertisements during, or prior to, presentation of the entertainment content, the content policy information obtained using a content identifier (CID) that is ascertained through one or both of (a) watermarks embedded in the one or more advertisements or the entertainment content, or (b) computation of fingerprints associated with the one or more advertisements or the entertainment content;
program code for receiving an indication that the CID associated with the entertainment content or the one or more advertisements is associated with a plurality of advertisement award programs for a particular user of the complaint device;
program code for providing an advertisement award program message indicating that modified presentation of the one or more advertisements is allowed in exchange for a specific number of award points of an advertisement award program;
program code for, upon receiving an indication that modified presentation of the one or more advertisements in exchange for the specific number of award points is desired, allowing the one or more advertisements to be presented in a modified form, and program code for, upon receiving an indication that modified presentation of the one or more advertisements in exchange for the specific number of award points is not desired: (a) presenting the one or more advertisements without modification, wherein at least one of the one or more advertisements is associated with the CID that corresponds to more than one of the plurality of advertisement award programs for the particular user of the compliant device, (b) determining by the compliant device which of the plurality of the one or more advertisement award programs constitutes a preferred award program, and (c) crediting the preferred award program with award points associated with the at least one of the one or more advertisements that were presented in unmodified form.

33. The method of claim 1, wherein the content policy information (CPI) is ascertained through extraction of an embedded watermark comprising an advertisement-obliged CPI state informing the compliant device that an obligation to present the one or more advertisements exists.

* * * * *